United States Patent
Zhang et al.

(10) Patent No.: US 11,937,328 B2
(45) Date of Patent: Mar. 19, 2024

(54) MILLIMETER WAVE LINK RELIABILITY AND POWER EFFICIENCY IMPROVEMENTS USING SENSOR INPUT

(71) Applicant: Apple Inc., Cupertino, CA (US)

(72) Inventors: Wei Zhang, Santa Clara, CA (US); Pengkai Zhao, San Jose, CA (US); Shiva Krishna Narra, San Jose, CA (US); Sriram Subramanian, Santa Clara, CA (US); Madhukar K. Shanbhag, Santa Clara, CA (US); Sanjeevi Balasubramanian, San Jose, CA (US); Junsung Lim, San Jose, CA (US); Jia Tang, San Jose, CA (US); Galib A. Mohiuddin, San Diego, CA (US); Yu-Lin Wang, Fremont, CA (US); Zhu Ji, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 17/195,270

(22) Filed: Mar. 8, 2021

(65) Prior Publication Data
US 2021/0289583 A1   Sep. 16, 2021

Related U.S. Application Data

(60) Provisional application No. 62/989,199, filed on Mar. 13, 2020.

(51) Int. Cl.
*H04W 76/28* (2018.01)
*H04W 24/10* (2009.01)
*H04W 52/02* (2009.01)

(52) U.S. Cl.
CPC .......... *H04W 76/28* (2018.02); *H04W 24/10* (2013.01); *H04W 52/0258* (2013.01); *H04W 52/0229* (2013.01)

(58) Field of Classification Search
CPC . H04W 76/28; H04W 24/10; H04W 52/0258; H04W 52/0229
(Continued)

(56) References Cited

U.S. PATENT DOCUMENTS 10,297,915 B2   5/2019   Jian et al.
10,958,325 B1*  3/2021   Park ..................... H04W 88/02
(Continued)

FOREIGN PATENT DOCUMENTS

WO       2013089679 A1      6/2013
WO    WO-2018017840 A1 *   1/2018   ........... H04B 7/0617
(Continued)

OTHER PUBLICATIONS

First Examination Report for Indian Patent Application No. 202114010126, 7 pages, dated Feb. 22, 2022.

*Primary Examiner* — Gbemileke J Onamuti
(74) *Attorney, Agent, or Firm* — Kowert, Hood, Munyon, Rankin & Goetzel, P.C.

(57) ABSTRACT

This disclosure relates to techniques for a wireless device to perform millimeter wavelength communication with increased reliability and power efficiency using sensor inputs. The sensor inputs may include motion, rotation, or temperature measurements, among various possibilities. The sensor inputs may be used when performing beamforming tracking, antenna configuration, transmit and receive chain measurements and selection, and/or in any of various other possible operations.

20 Claims, 17 Drawing Sheets

(58) Field of Classification Search
USPC .......................................................... 370/331
See application file for complete search history.

(56) References Cited

U.S. PATENT DOCUMENTS

| | | | |
|---|---|---|---|
| 10,992,368 B1* | 4/2021 | Chisu | H04B 7/0814 |
| 2019/0044628 A1* | 2/2019 | Morita | H04B 17/29 |
| 2019/0166553 A1 | 5/2019 | Ryoo et al. | |
| 2019/0191425 A1* | 6/2019 | Zhu | H04B 7/0695 |
| 2019/0281652 A1* | 9/2019 | Zhang | H04W 52/0216 |
| 2020/0076488 A1 | 5/2020 | Brunel | |
| 2020/0205219 A1 | 6/2020 | Chen et al. | |

FOREIGN PATENT DOCUMENTS

| | | |
|---|---|---|
| WO | 2018203822 A1 | 11/2018 |
| WO | 2021020952 A1 | 2/2021 |

* cited by examiner

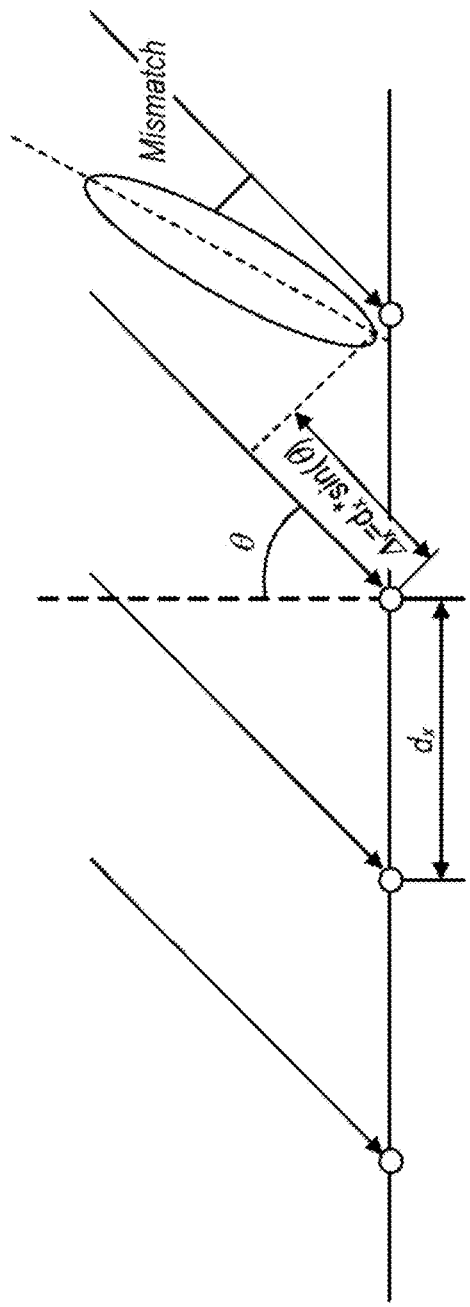
FIG. 8
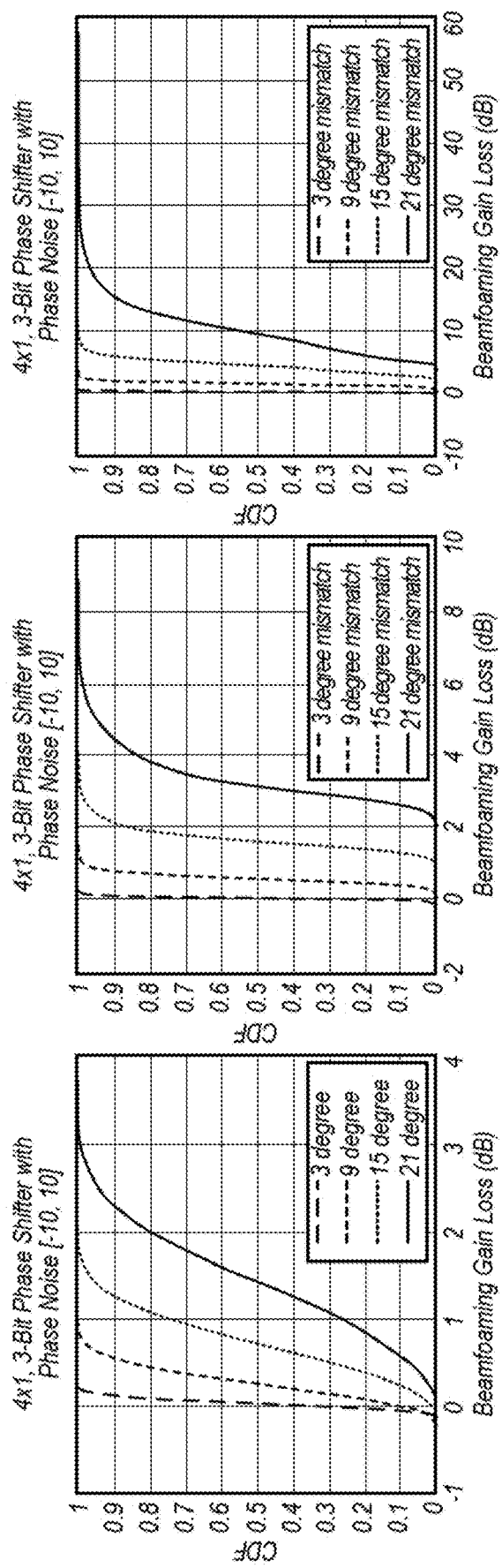
FIG. 9
FIG. 10
FIG. 11

MILLIMETER WAVE LINK RELIABILITY AND POWER EFFICIENCY IMPROVEMENTS USING SENSOR INPUT

PRIORITY INFORMATION

This application claims priority to U.S. provisional patent application Ser. No. 62/989,199, entitled "Millimeter Wave Link Reliability and Power Efficiency Improvements Using Sensor Input," filed Mar. 13, 2020, which is hereby incorporated by reference in its entirety as though fully and completely set forth herein.

FIELD

The present application relates to wireless communications, and more particularly to systems, apparatuses, and methods for a wireless device to perform millimeter wavelength communication with increased reliability and power efficiency using sensor inputs.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for a wireless device to perform millimeter wavelength communication with increased reliability and power efficiency using sensor inputs.

As one possibility, the sensor inputs may include inputs from motion and/or rotation sensors. Such information can be used when performing beamforming tracking, for example during connected discontinuous reception (CDRX), to compensate for motion/rotation that may have occurred since beamforming tracking was previously performed (e.g., during the previous CDRX on duration, or possibly during the CDRX off duration if the wireless device woke up to perform beamforming tracking during that time). Such information can also be used to determine how frequently to perform beamforming tracking, e.g., to determine how often to wake up to perform beamforming tracking during CDRX off duration periods. For example, it may be useful to perform beamforming tracking more often when the wireless device is experiencing more rotation, or more irregular rotation, than when the wireless device is experiencing less rotation, or more regular/predictable rotation. Further, such information can be used to determine which antenna panel(s) and beam(s) to prioritize when performing such beamforming tracking, e.g., as the wireless device may be able to determine its (e.g., approximate) orientation using motion/rotation information for the wireless device.

As another possibility, motion and/or rotation information may be used to determine the adaptive receive and transmit diversity configuration of the wireless device. For example, the motion and/or rotation information can be used to determine a rotation stability state of the wireless device, which may in turn affect how frequently and/or for what duration receive chain measurements are performed, how many receive chains are used for downlink reception, what beam width(s) to use when performing receive chain measurements, and/or any of various other aspects of the adaptive receive and transmit diversity configuration of the wireless device.

Still further, it may be possible that the wireless device performs antenna configuration selection based at least in part on temperature information for the wireless device. For example, to avoid overheating, the temperature at each of one or more antenna panels of the wireless device may be monitored. If the temperature at the currently active antenna panel reaches a certain threshold, the wireless device may determine to change the current antenna configuration. This could include switching to a different antenna panel, or reducing the number of active antenna elements of the currently active antenna panel, among various possibilities.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 8 illustrates a possible beam mismatch such as could occur in an antenna array, using an example of a 2 dimensional signal, according to some embodiments;

FIGS. 9-11 are cumulative distribution functions (CDFs) illustrating the potential beamforming gain loss for various possible beam mismatches in various scenarios, according to some embodiments;

Figure 1:
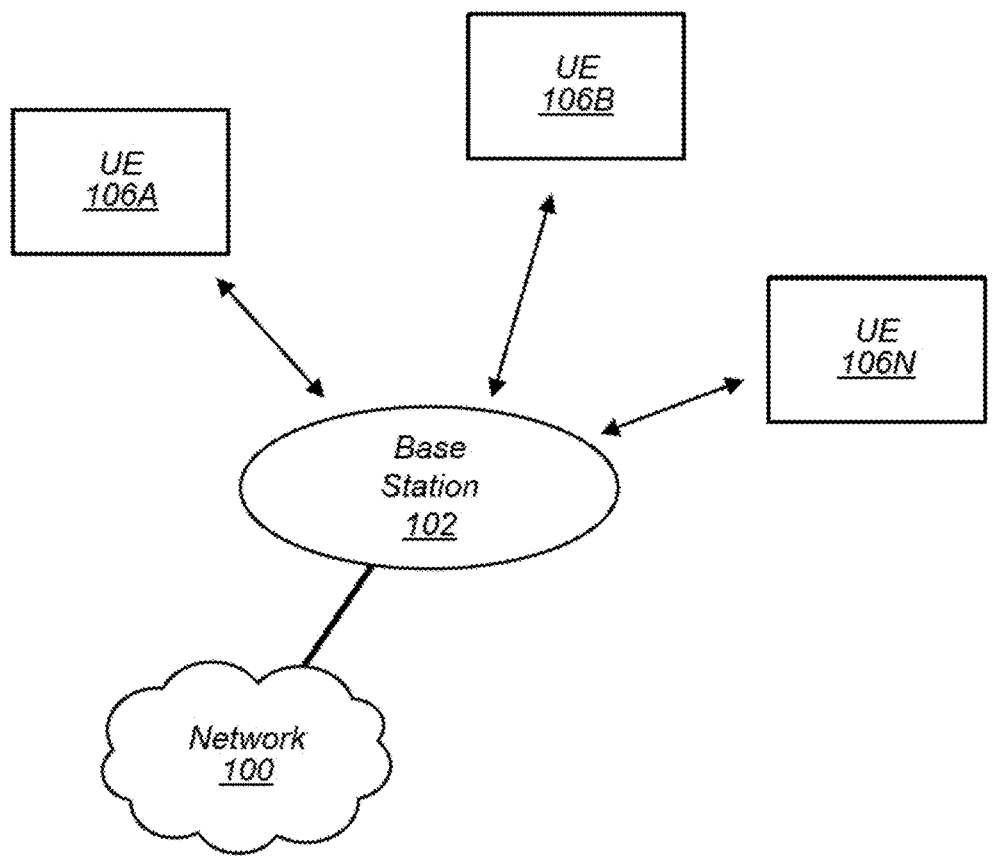
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
  UE: User Equipment
  RF: Radio Frequency
  BS: Base Station
  GSM: Global System for Mobile Communication
  UMTS: Universal Mobile Telecommunication System
  LTE: Long Term Evolution
  NR: New Radio
  TX: Transmission/Transmit
  RX: Reception/Receive
  RAT: Radio Access Technology
  CSI: Channel State Information
  CSI-RS: Channel State Information Reference Signals
  CQI: Channel Quality Indicator
  PMI: Precoding Matrix Indicator
  RI: Rank Indicator Terms The following is a glossary of terms that may appear in the present disclosure:
  Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.
  Carrier Medium—a memory medium as described above, as well as a physical transmission medium, such as a bus, network, and/or other physical transmission medium that conveys signals such as electrical, electromagnetic, or digital signals.
  Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, automobiles and/or motor vehicles, unmanned aerial vehicles (UAVs) (e.g., drones) and unmanned aerial controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
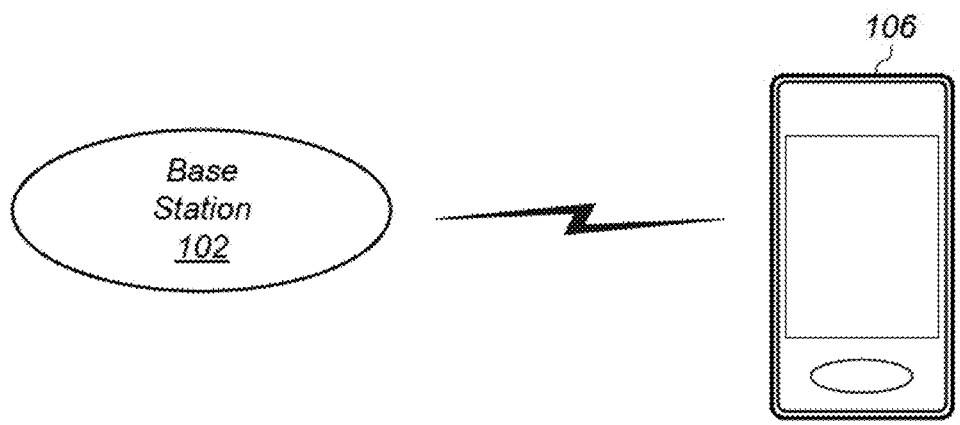
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform millimeter wavelength communication with increased reliability and power efficiency using sensor inputs such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
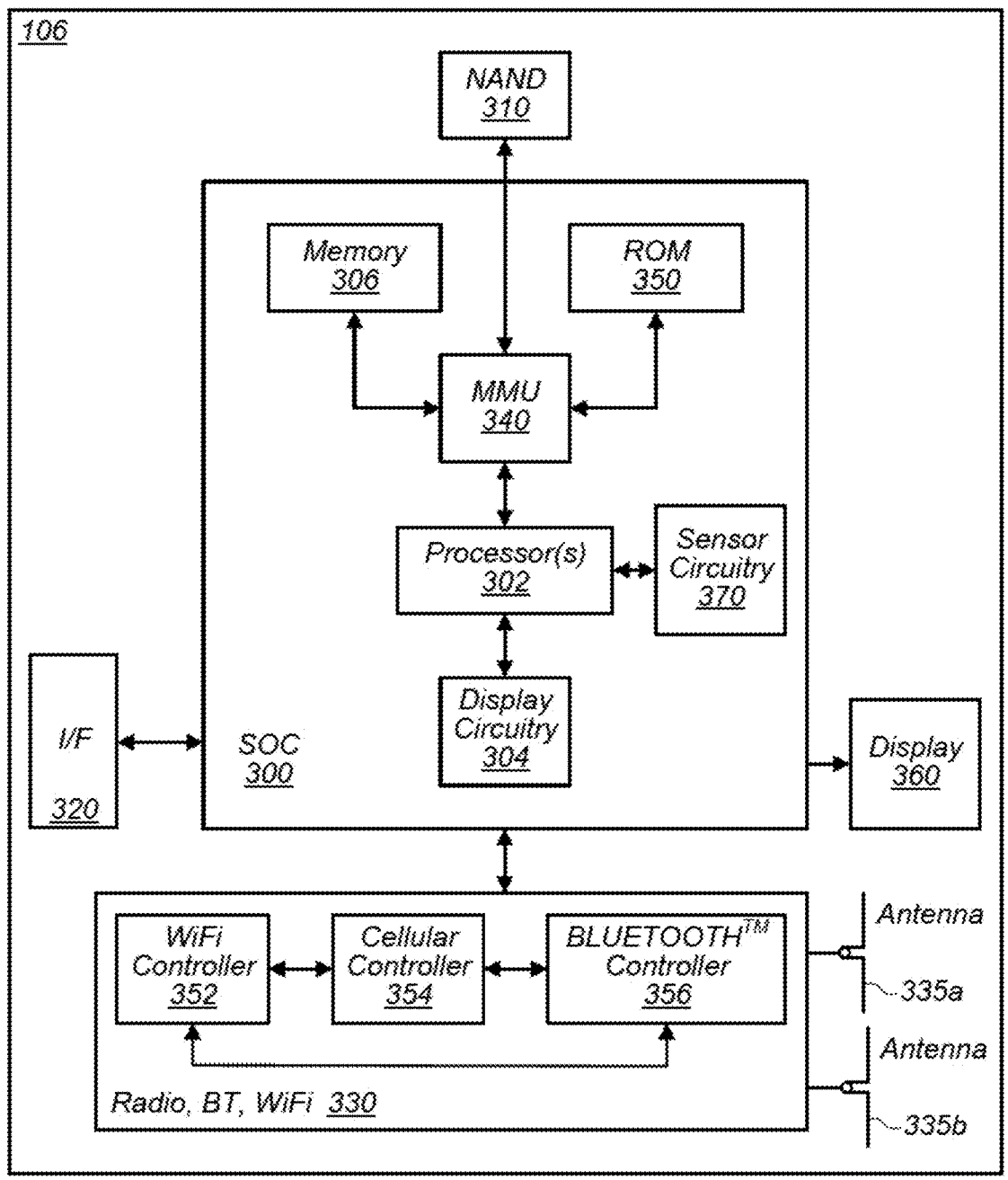
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform millimeter wavelength communication with increased reliability and power efficiency using sensor inputs such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform millimeter wavelength communication with increased reliability and power efficiency using sensor inputs according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
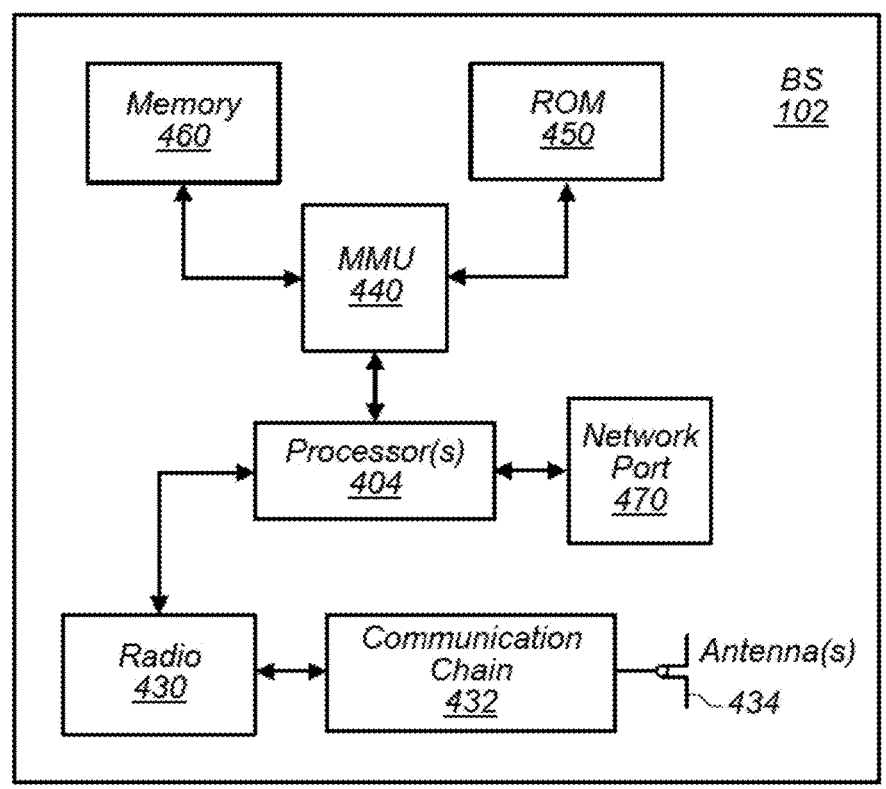
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Channel State Information

A wireless device, such as a user equipment, may be configured to measure the quality of the downlink channel and report information related to this quality measurement to the base station. For example, the UE may periodically send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In most cellular systems, the base station transmits a pilot signal (or a reference signal), such as channel state information reference signals (CST-RS), where this reference signal is used for estimating a channel (or a portion of a channel) between the base station and a UE. The UE receives this reference signal and based on this reference signal calculates channel state information (CSI). The UE then reports this channel state information back to the base station. The base station may then generate downlink data based on the received CSI and transmit this downlink data to the UE, Stated another way, the base station may adjust the manner in which downlink data is coded and generated based on the received channel state information from the UE.

As an example, in the 3GPP NR cellular communication standard, the channel state information fed back from the UE may include one or more of a channel quality indicator (CQI), a precoding matrix indicator (PMI), a rank indicator (RI), a CSI-RS Resource Indicator (CRI), a SSBRI (SS/PBCH Resource Block Indicator), and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the LIE is determined to be high, the UE may feed back a high CQI value, which may cause the base station to transmit data using a relatively high modulation order and/or a low channel coding rate. As another example, when the downlink channel communication quality between the base station and the LTE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
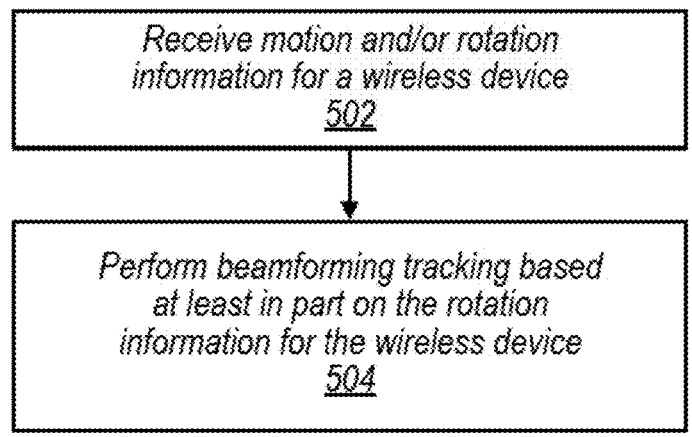
FIGS. 5-6 are flowchart diagrams illustrating aspects of exemplary possible methods for a wireless device to perform millimeter wavelength communication with increased reliability and power efficiency using sensor inputs, according to some embodiments.
Figure 6:
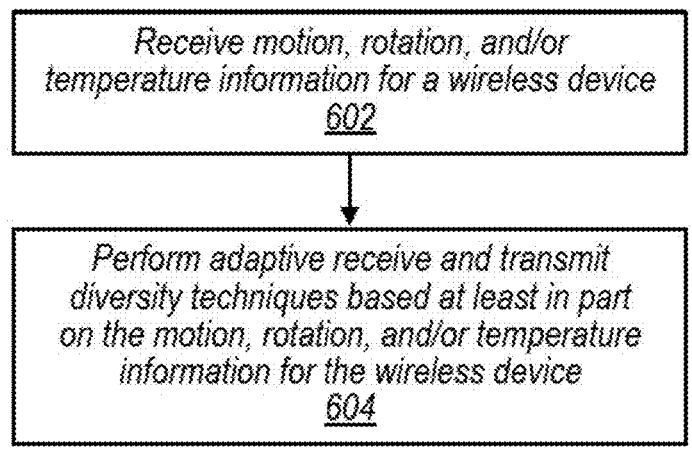

FIGS. 5-6—Millimeter Wavelength Communication with Increased Reliability and Power Efficiency Using Sensor Inputs FIGS. 5-6 are flowchart diagrams illustrating methods for a wireless device (e.g., a wireless user equipment (UE) device, as one possibility) to perform millimeter wavelength communication with increased reliability and power efficiency using sensor inputs, at least according to some embodiments.

Aspects of the methods of FIGS. 5-6 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the methods of FIGS. 5-6 are described in a manner relating to the use of communication techniques and/or features associated with 3GPP and/or NR specification documents, such description is not intended to be limiting to the disclosure, and aspects of the methods of FIGS. 5-6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the methods of FIGS. 5-6 may operate as follows.

FIG. 5 is a flowchart diagram illustrating a method for a wireless device (or UE) to improve beamforming monitoring using motion sensor inputs, according to some embodiments.

The wireless device may establish a wireless link with a cellular base station. According to some embodiments, the wireless link may include a cellular link according to LTE. For example, the wireless device may establish a session with a mobility management entity of the cellular network by way of an eNB that provides radio access to the cellular network. As another possibility, the wireless link may include a cellular link according to 5G NR. For example, the wireless device may establish a session with an AMF entity of the cellular network by way of a gNB that provides radio access to the cellular network. Other types of cellular links are also possible, and the cellular network may also or alternatively operate according to another cellular communication technology (e.g., UMTS, CDMA2000, GSM, etc.), according to various embodiments. Note that it may also be possible for the wireless device to establish a wireless link that includes connectivity using multiple radio access technologies, such as may be possible in a dual connectivity NR-LTE configuration.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In 502, the wireless device may receive motion and/or rotation information for the wireless device. In some instances, the wireless device may determine a rotation delta of the wireless device relative to a previous beamforming tracking operation performed by the wireless device. As another possibility, a rotation speed of the wireless device may be determined. Any of various other measurements or types of motion/rotation information are also possible. At least according to some embodiments, the motion and/or rotation information may be received from one or more motion and/or rotation sensing components of the wireless device, and/or from a module of the wireless device that processes information obtained by motion and/or rotation sensing components of the wireless device.

In 504, the wireless device may perform beamforming tracking based at least in part on the rotation information for the wireless device. As one possibility, this may include selecting a one or more beamforming codewords to prioritize for the beamforming tracking operation, based at least in part on a rotation delta of the wireless device relative to the previous beamforming tracking operation performed by the wireless device. For example, a beamforming codeword associated with an orientation of the wireless device derived based on the beamforming codeword selected at the previous beamforming tracking operation and the rotation delta of the wireless device relative to the previous beamforming tracking operation may be prioritized for the beamforming tracking operation, in some instances. In some instances, antenna panel selection for the beamforming tracking operation may be performed based at least in part on the rotation information for the wireless device; for example, an antenna panel best suited for operation at the determined orientation of the wireless device may be selected, as one possibility. In some instances, a beam width to use (or to prioritize) for the beamforming tracking operation may be selected based at least in part on the rotation information. For example, an uncertainty of the determined rotation delta may be determined, and a wider beam width may be selected for the beamforming tracking operation if the rotation delta has a greater uncertainty (e.g., if it is above a certain threshold) than if the rotation delta has a lower uncertainty (e.g., if it is below a certain threshold).

The beamforming tracking may be performed at any of a variety of possible times. As one possibility, the beamforming tracking may be performed during connected discontinuous reception (CDRX) operation, such as during a CDRX on duration, or during a CDRX off duration (e.g., if the wireless device autonomously wakes up to perform beam monitoring). The previous beamforming tracking operation may similarly have occurred during a previous CDRX on duration, or possibly previously during a CDRX off duration.

According to some embodiments, it may be the case that the wireless device determines wakeup timing during a subsequent CDRX off duration based at least in part on the rotation information for the wireless device. For example, the wireless device may determine how often to wake up for beamforming monitoring (e.g., to monitor synchronization signal blocks or SSBs) during the CDRX off duration based on how much rotation the wireless device is experiencing, e.g., such that more frequent wireless device wakeup timing could be selected if the wireless device has a greater rotation speed (e.g., if it is above a certain threshold) than if the wireless device has a lower rotation speed (e.g., if it is below a certain threshold).

Thus, the method of FIG. 5 may help improve link quality (e.g., by improving beamforming tracking of the wireless device while experiencing significant rotation) and/or reduce power consumption (e.g., by reducing the number of wakeup occurrences during CDRX off durations for beam monitoring and/or improving the efficiency of beam tracking operations) for a wireless device operating in a millimeter wave frequency range, at least in certain circumstances.

FIG. 6 is a flowchart diagram illustrating a method for a wireless device (or UE) to improve adaptive receive and transmit diversity techniques using motion and temperature sensor inputs, according to some embodiments.

The wireless device may establish a wireless link with a cellular base station. According to some embodiments, the wireless link may include a cellular link according to LTE. For example, the wireless device may establish a session with a mobility management entity of the cellular network by way of an eNB that provides radio access to the cellular network. As another possibility, the wireless link may include a cellular link according to 5G NR. For example, the wireless device may establish a session with an AMF entity of the cellular network by way of a gNB that provides radio access to the cellular network. Other types of cellular links are also possible, and the cellular network may also or alternatively operate according to another cellular communication technology (e.g., UMTS, CDMA2000, GSM, etc.), according to various embodiments. Note that it may also be possible for the wireless device to establish a wireless link that includes connectivity using multiple radio access technologies, such as may be possible in a dual connectivity NR-LTE configuration.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In 602, the wireless device may receive motion, rotation, and/or temperature information for the wireless device. The temperature information may include local temperature measurements for one or more antenna panels of the wireless device, according to some embodiments. The motion/rotation information may include maximum and/or mean rotation angle over a time window (which may be filtered or unfiltered), a rotation outage ratio (e.g., the number of times the wireless device has rotated more than a threshold), and/or any of various other rotation and/or motion measurements, according to various embodiments. At least according to some embodiments, the temperature, motion, and/or rotation information may be received from one or more temperature, motion and/or rotation sensing components of the wireless device, and/or from a module of the wireless device that processes information obtained by temperature, motion, and/or rotation sensing components of the wireless device.

In some embodiments, the wireless device may determine a rotation stability state of the wireless device, for example based on one or more rotation measurements of the wireless device, or possibly based on a beamforming codeword change rate, e.g., if rotation information is (e.g., temporarily) unavailable. For example, if the rotation speed or rotation outage ratio (or both) are above a certain configured threshold, the wireless device may determine that it is in a first ("unstable" or "rotation") rotation stability state, while if the rotation speed or rotation outage ratio (or both) are below a certain configured threshold, the wireless device may determine that it is in a second ("stable" or "stationary") rotation stability state. Note that more than two rotation stability states (e.g., in conjunction with a set of multiple configured thresholds for determining the rotation stability state of the wireless device) could be used, if desired.

In 604, the wireless device may perform adaptive receive and transmit diversity techniques based at least in part on the motion, rotation, and/or temperature information for the wireless device. For example, as one possibility, this may include determining a number of receive chains to use for receive chain monitoring, and/or a frequency at which to perform receive chain monitoring, based at least in part on the rotation stability state of the wireless device. In some instances, power saving may be prioritized when determining the number of receive chains to use for receive chain monitoring and/or the frequency at which to perform receive chain monitoring more highly when the wireless device is in a stable rotation stability state than when the wireless device is in an unstable rotation stability state. Such prioritization could include, when the wireless device is in the stable rotation stability state, any or all of: reducing a frequency at which receive chain monitoring is performed; reducing a number of receive chains that are monitored during receive chain monitoring; reducing a measurement duration for receive chain monitoring; or reducing a time hysterisis parameter for reducing a number of receive chains in use, at least according to some embodiments. Other ways of prioritizing power saving while in the stable rotation stability state are also possible.

Likewise, in some instances, link quality may be prioritized when determining the number of receive chains to use for receive chain monitoring and/or the frequency at which to perform receive chain monitoring more highly when the wireless device is in the unstable rotation stability state than when the wireless device is in the stable rotation stability state. Such prioritization could include, when the wireless device is in the unstable rotation stability state, any or all of: increasing a frequency at which receive chain monitoring is performed; increasing a number of receive chains that are monitored during receive chain monitoring; increasing a beam width used when performing receive chain monitoring; or increasing a measurement duration for receive chain monitoring, at least according to some embodiments. Other ways of prioritizing link quality while in the unstable rotation stability state are also possible.

As previously noted herein, is some instances temperature information for one or more antenna panels of the wireless device may be available to the wireless device. In some instances, the adaptive receive and transmit diversity techniques implemented by the wireless device may be based at least in part on such temperature information. For example, a temperature of a currently active antenna panel of the wireless device may be determined, and if the temperature is above a certain threshold, the wireless device may determine to modify its current antenna configuration. As one possibility, this may include reducing the number of active antenna elements of the currently active antenna panel. For example, this approach may be selected if the temperature of the currently active antenna panel is above a first temperature threshold, but below a second temperature threshold (e.g., which may be higher than the first temperature threshold), and if a signal strength at the currently active antenna panel minus a signal strength at an antenna panel with a next highest signal strength is greater than a signal strength threshold (e.g., which may indicate that the loss of signal strength that would occur if the wireless device switched to that antenna panel may be significant), at least according to some embodiments. As another possibility, the antenna configuration may include switching to an antenna panel with the next highest signal strength. For example, this approach may be selected if the temperature of the currently active antenna panel is above both the first temperature threshold and the second temperature threshold. As another possibility, this approach may be selected if the temperature of the currently active antenna panel is above the first temperature threshold but below the second temperature threshold, and if a signal strength at the currently active antenna panel minus a signal strength at an antenna panel with a next highest signal strength is less than a signal strength threshold (e.g., which may indicate that the loss of signal strength that would occur if the wireless device switched to that antenna panel may be considered acceptable), at least according to some embodiments.

In some instances, to facilitate antenna panel switching while retaining the same beamforming direction (e.g., such as might be desired if performing antenna panel switching to avoid overheating problems), it may be useful to configure beamforming codeword indices to associate beamforming codewords of different codebooks (e.g., associated with different antenna panels) that are oriented in the same direction. For example, consider a scenario in which the wireless device is using a first antenna panel to perform cellular communication with a cellular base station using a first beamforming codeword associated with a first beam direction, and in which the wireless device determines to switch from using the first antenna panel to using a second antenna panel of the wireless device. The wireless device may determine that a second beamforming codeword for the second antenna panel is also associated with the first beamforming direction, for example as the first beamforming codeword and the second beamforming codeword may have the same index value in a beamforming codeword index stored by the wireless device. In such a scenario, the wireless device may use the second beamforming codeword when using the second antenna panel to perform cellular communication with the cellular base station based at least in part on determining that the second beamforming codeword for the second antenna panel is also associated with the first beamforming direction.

Thus, the method of FIG. 6 may help improve link quality (e.g., by prioritizing link quality when in an unstable rotation state) and/or reduce power consumption (e.g., by prioritizing power consumption reduction when in a stable rotation state) for a wireless device operating in a millimeter wave frequency range, at least in certain circumstances.

FIGS. 7-27 and Additional Information

FIGS. 7-27 illustrate further aspects that might be used in conjunction with the methods of FIGS. 5-6 if desired. It should be noted, however, that the exemplary details illustrated in and described with respect to FIGS. 7-27 are not intended to be limiting to the disclosure as a whole: numerous variations and alternatives to the details provided herein below are possible and should be considered within the scope of the disclosure.

As smart phones and other wireless devices have evolved, more sensors (motion, orientation, temperature) are commonly available on the same platforms, which may thus bring more opportunity to improve link reliability and improve UE power efficiency, including in millimeter wave (mmWave) spectrum for 3GPP 5G NR communication.

For mmWave communication, beamforming may add an additional dimension to the link reliability, and may also complicate power consumption management. Orientation and rotation information from motion sensors can be used to help coordinate beamforming tracking and also adjust/compensate transmit and receive beam directions, e.g., as it may be possible for a UE to be rotating/moving quickly over short or long duration time periods. Temperature information, for example for the vicinity of the current transmit/receive chain(s) and/or candidate chains, can also potentially be obtained from temperature sensors, and used as part of transmit and receive antenna selection to reduce the potential impact of overheating on a wireless device. Depending on the power cost of different beamforming patterns (e.g., that use different numbers of active antenna elements), it may further be possible to adjust the current beamforming configuration/chain, e.g., based on the temperature conditions of the wireless device.

Analog transmit and receive beamforming with the cooperation between the gNB and the UE can help to explore the angle of arrival (AoA) to obtain beamforming gain in mmWave 5G NR communication. The network may coordinate resource usage (e.g., via RRC commands and/or MAC control elements) for such operation, which may include provision of extra overhead/load in the form of aperiodic and/or semi-persistent resources, e.g., to support beamforming tracking by the gNB and the UE.

As a UE could be rotating or otherwise moving quickly, potentially over a very short time duration, e.g., due to user behavior such as changing hands in which a UE is held, rotating direction, walking around, etc., it may be the case that directional information from motion sensing circuitry of the UE can help the modem chipset to perform the analog beamforming. This could include coordinating beamforming tracking behavior, e.g., based on a motion/rotation state, and/or adjusting/compensating transmit and/or receive beam direction, e.g., based on a measured amount of motion/rotation.

Figure 7:
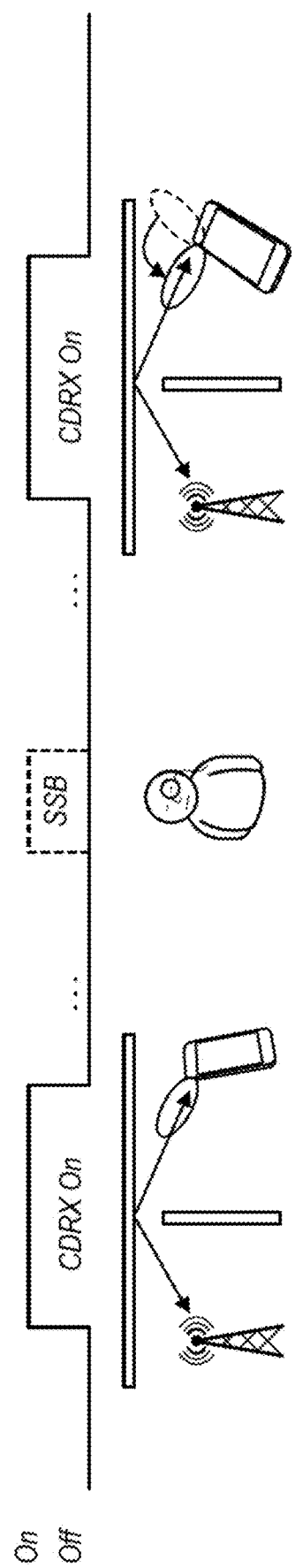
FIG. 7 illustrates aspects of a possible scenario in which a UE undergoes rotation while in CDRX operation, according to some embodiments.

One aspect of UE operation that may potentially benefit from use of motion sensing information for the UE may include connected discontinuous reception (CDRX) operation. FIG. 7 illustrates aspects of a possible scenario in which a UE undergoes rotation while in CDRX operation, according to some embodiments. As shown, in a first CDRX on period, the UE may use a first beam to communicate with a serving gNB. During a CDRX off period after the CDRX on period, the UE may wakeup to monitor a synchronization signal block (SSB) transmission by the gNB, e.g., to maintain beamforming tracking. During a second CDRX on period, the UE may use a second (e.g., different) beam to communicate with the serving gNB, possibly using a different antenna panel, due to the rotation of the UE. As illustrated, it may be possible for a relatively large rotation angle and beam/AoA mismatch between monitoring instances in CDRX operation. Accordingly, orientation information for the UE may be helpful in prioritizing certain antenna panels and/or potential beams while performing beamforming tracking during CDRX on periods after a certain off duration. Additionally or alternatively, power/performance tradeoff balance can be managed by selecting how often the UE autonomously wakes up during CDRX off periods for beam monitoring, e.g., based at least in part on motion sensor information.

FIG. 8 illustrates a possible beam mismatch such as could occur in an antenna array with 4 antenna elements each at a distance $d_x$ from the next antenna element in the antenna array, using an example of a 2 dimensional signal, according to some embodiments. FIGS. 9-11 are cumulative distribution functions (CDFs) illustrating the potential beamforming gain loss (in dB) for each of 3, 9, 15, or 21 degree mismatches in various scenarios, according to some embodiments. In particular, FIG. 9 illustrates the potential beamforming gain loss for a 4×1 antenna array configured for 28 GHz communication with $d=\lambda/4=2.7$ mm assuming an ideal unidirectional antenna radiation pattern, FIG. 10 illustrates the potential beamforming gain loss for a 4×1 antenna array configured for 28 GHz communication with $d=\lambda/4=2.7$ mm assuming a 3GPP model unidirectional antenna radiation pattern, and FIG. 11 illustrates the potential beamforming gain loss for a 4×1 antenna array configured for 28 GHz communication with $d=\lambda/2=5.4$ mm assuming a 3GPP model unidirectional antenna radiation pattern.

Figure 12:
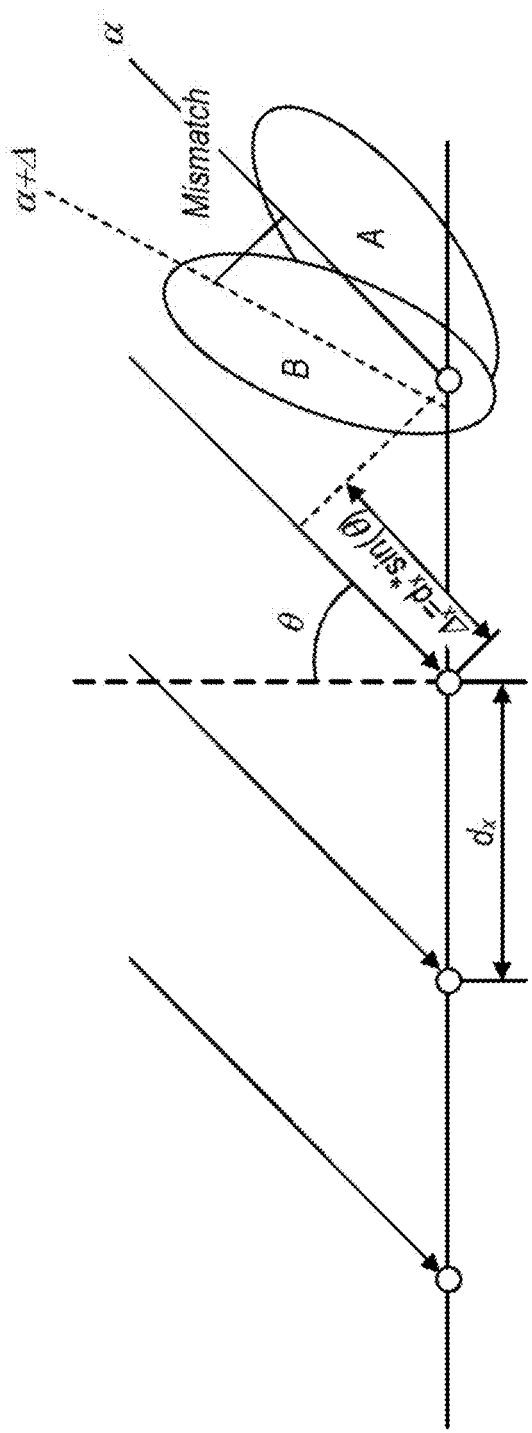
FIG. 12 illustrates further aspects of a possible beam mismatch scenario such as could occur in an antenna array, using an example of a 2 dimensional signal, according to some embodiments.

FIG. 12 illustrates further aspects of a possible beam mismatch scenario such as could occur in an antenna array with 4 antenna elements each at a distance $d_x$ from the next antenna element in the antenna array, using an example of a 2 dimensional signal, according to some embodiments. In the illustrated scenario of FIG. 12, a codebook based approach may be taken to performing beamforming, in which codeword "A" may be represent one beam that could be used by a UE, and codeword "B" may represent another beam that could be used by the UE. Thus, in such an approach, it may be the case that no one codeword provides an exact match to the AoA of the incoming beam. Thus, in such a scenario, the loss due to rotation without the proper beamforming and selecting codeword B instead of codeword A could be considered to be the gain of receiving $\alpha+\Delta$ using codeword B—the gain of receiving $\alpha+\Delta$ using codeword A. Note that in this example, the codewords assumption may include [±45, ±30, ±15, 0] for array response and [±24, ±17, ±10, 0] for overall response, with incoming signal AoA limited to [−60,60].

Figure 14:
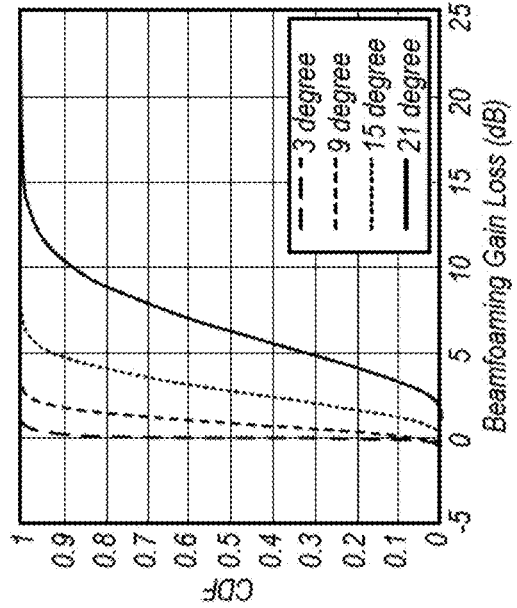
FIGS. 13-16 are CDFs illustrating the potential beamforming gain loss for various combinations of codebook sizes and antenna array spacings, according to some embodiments.
Figure 16:
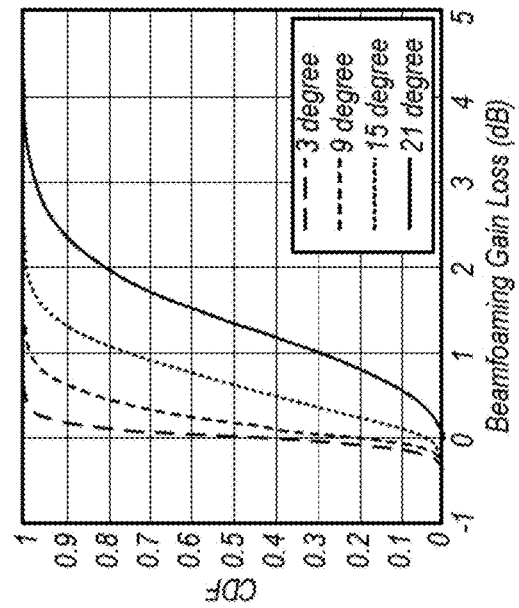
Figure 13:
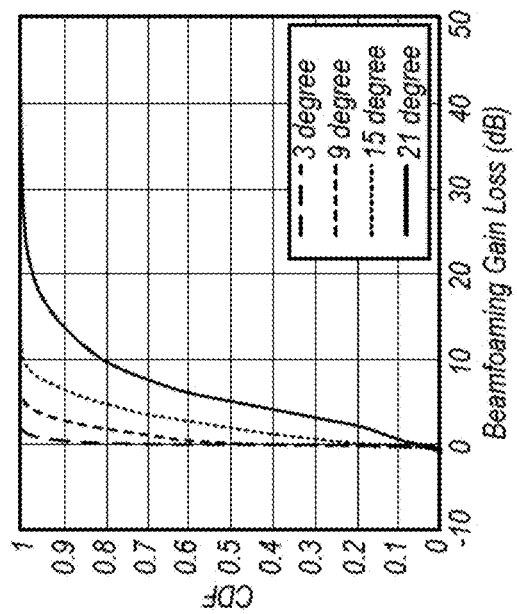
Figure 15:
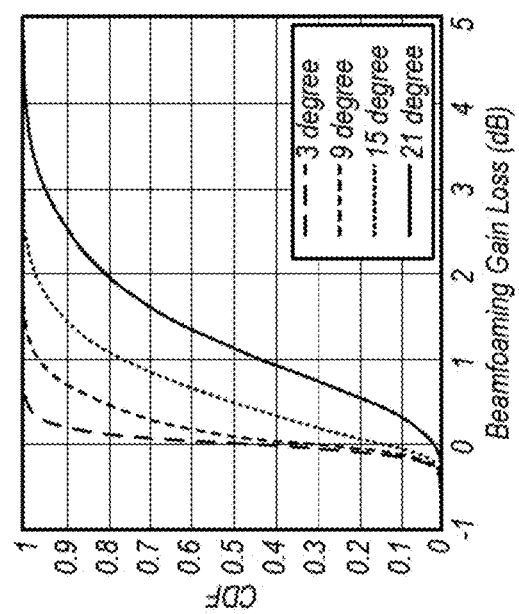

FIGS. 13-16 are CDFs illustrating the potential beamforming gain loss for a 4×1 antenna array (assuming a 3GPP model unidirectional antenna radiation pattern) with various combinations of codebook sizes and antenna array spacings, according to some embodiments. In particular, FIG. 13 illustrates the potential beamforming gain loss for a 4×1 antenna array configured for 28 GHz communication with d=λ/2=5.4 mm with a 7 codeword codebook, FIG. 14 illustrates the potential beamforming gain loss for a 4×1 antenna array configured for 28 GHz communication with d=λ/2=5.4 mm with a 23 codeword codebook, FIG. 15 illustrates the potential beamforming gain loss for a 4×1 antenna array configured for 28 GHz communication with d=λ/4=2.7 mm with a 7 codeword codebook, and FIG. 16 illustrates the potential beamforming gain loss for a 4×1 antenna array configured for 28 GHz communication with d=λ/4=2.7 mm with a 23 codeword codebook. As can be seen, an increase in antenna array spacing from λ/4 to λ/2 may lead to higher loss, e.g., due to a narrower beam at λ/2. As can also be seen, codebook size increase may lead to slightly larger loss, e.g., because a smaller codebook may be naturally more robust to rotation since there may be a higher chance that the best codeword will remain the same after rotation due to the lower resolution of codewords. However, by the same consideration, coverage may be worse with fewer codewords, at least in some instances.

Figure 17:
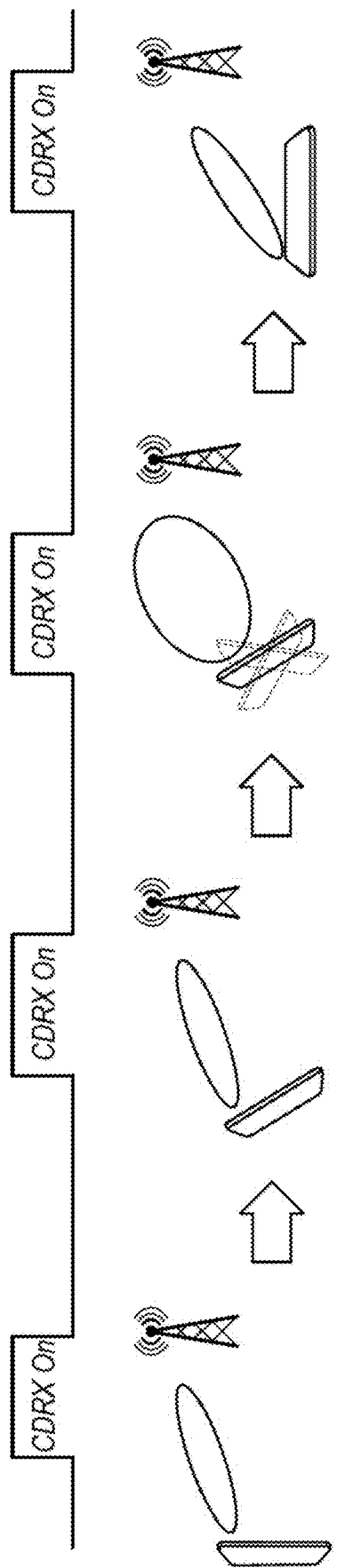
FIG. 17 illustrates aspects of a scenario in which a progression of beamforming tracking operations are performed at each of several CDRX on duration periods for a UE, according to some embodiments.

One possible way in which sensor information can be used to improve reliability and power efficiency of millimeter wavelength communication may include codebook based UE autonomous beam selection with rotation compensation. This may include obtaining orientation delta information from motion sensing circuitry of the UE when performing beamforming tracking, and autonomously compensating for rotation angle change relative to previous beamforming results to determine the prioritization of new beamforming direction(s). Further, it may be possible to perform narrow or wide beam selection based at least in part on an uncertainty level of the orientation delta. For example, a wider beam could be selected if there is a higher degree of uncertainty regarding the orientation delta (e.g., due to rapid or otherwise difficult to measure motion/rotation of the UE) than if there is less uncertainty regarding the orientation delta. Antenna panel prioritization (e.g., if applicable, given the UE configuration) can also be determined once the new beamforming direction is projected. FIG. 17 illustrates aspects of a scenario in which a progression of beamforming tracking operations are performed at each of several CDRX on duration periods for a UE, according to some embodiments. As shown, in each instance, the UE may be oriented in a different manner, which may impact which beam would provide the best performance. In each case, an orientation delta measured by the UE may be used to select the beam, and at least in the third instance, it may be the case that a wider beam is selected, e.g., due to a higher degree of uncertainty regarding the orientation of the UE.

At least in some instances, in order to support such use of orientation information in beam selection, it may be important that low latency UE rotation/orientation angle reporting (e.g., periodic or triggered) capability is available at the UE, and that information associating codewords of the beamforming codebook with angles (azimuth, elevation) is available for each antenna panel of the UE.

Another possible way in which sensor information can be used to improve reliability and power efficiency of millimeter wavelength communication may include dynamic beamforming monitoring during CDRX operation based on UE rotation speed. This may include dynamically determining wakeup behavior of a UE during a CDRX off period for beamforming monitoring to achieve a desired balance between performance and power in view of the motion sensor information available to the UE.

In some instances, this technique may include determining the maximum mismatch angle based on the worst case beamforming loss that the UE can tolerate for the UE configuration (e.g., including array dimensions (e.g., architecture, spacing), antenna radiation pattern, codebook design, etc.). The UE may then determine how frequently to wakeup during the next CDRX off duration based on the configured CDRX setup and the instantaneous (predicted) rotation speed at the end of each CDRX on period, e.g., in view of the determined maximum mismatch angle. In some instances, the UE motion speed (e.g., in addition to rotation speed) can also be considered to determine the wakeup periodicity, e.g., since it can potentially lead to a gNB transmit beam preference change on the UE side.

Figure 18A:
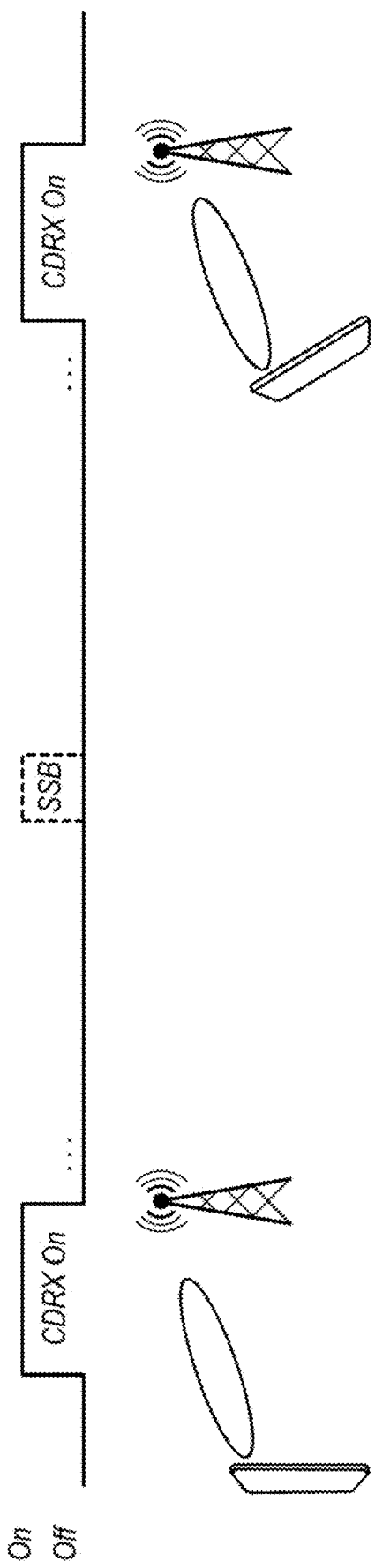
FIGS. 18A-18B illustrate aspects of certain scenarios in which a dynamic beamforming monitoring technique is used, according to some embodiments.
Figure 18B:
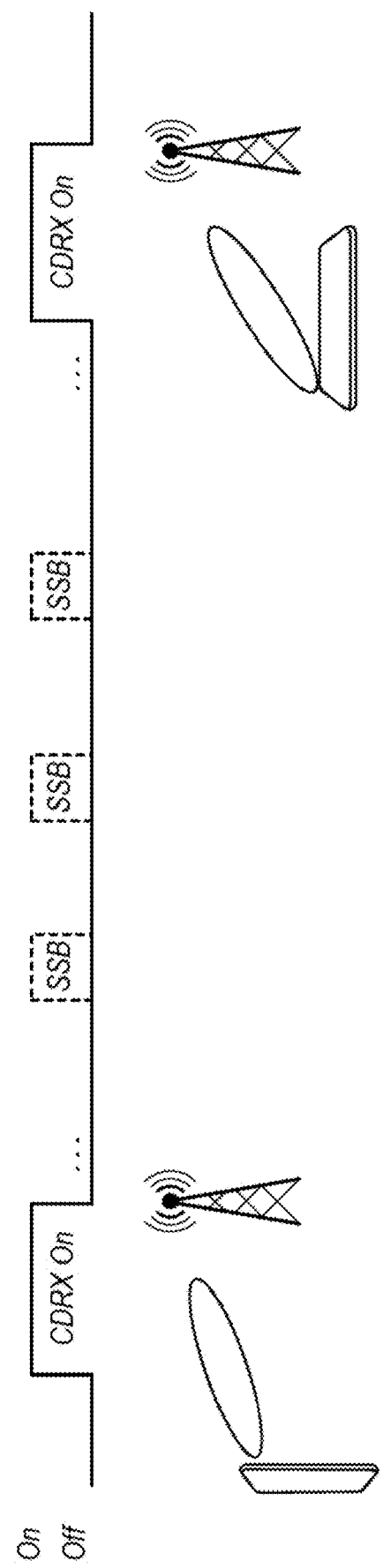

FIGS. 18A-18B illustrate aspects of certain scenarios in which such a dynamic beamforming monitoring technique is used, according to some embodiments. In particular, FIG. 18A illustrates a scenario in which a UE is rotating relatively slowly, and in which the UE determines based on the UE's rotation speed to wake up one time to perform beamforming monitoring using SSB signals provided by the gNB during the CDRX off duration. In contrast, FIG. 18B illustrates a scenario in which a UE is rotating relatively quickly, and in which the UE determines based on the UE's rotation speed to wake up three times to perform beamforming monitoring using SSB signals provided by the gNB during the CDRX off duration.

Adaptive receive diversity may include dynamically adjusting the number of receive chains in use by a UE that has multiple receive chains available, based on any of various possible considerations, such as channel conditions, UE power saving preferences, traffic load, etc. For example, a UE with 4 receive chains could adaptively switch between use of 1 receive chain, 2 receive chains, or 4 receive chains. Similarly, transmit antenna selection can be used to switch which transmit antenna(s) is (are) used, e.g., based on measurements, occurrence of a configured trigger/event, and/or based on any of various other possible considerations. Blockage (e.g., physical objects interfering with the line of sight, which may be particularly impactful to mmWave communication) may represent one major possible cause for performing transmit antenna selection. The transmit antenna selection may be targeted to find the best available antenna(s) for transmission, at least according to some embodiments. Both adaptive receive diversity (ARD) and adaptive transmit diversity (ATD), which may also collectively be referred to as adaptive receive and transmit diversity (ARTD), may be a further aspect of UE operation that can potentially benefit from use of information from sensor circuitry of the UE, such as motion/orientation sensors and/or temperature sensors.

For example, for mmWave communication, beamforming techniques may add a further dimension to the ARTD selection process. A UE can be experiencing fast rotation/ movement due to user behavior, such as changing handheld position of the UE, rotating the UE, or walking around. As previously noted, orientation/rotation information from motion sensors can be used to help coordinate beamforming tracking and also adjust/compensate Tx/Rx beam direction, and can further be used in determining how many/which transmit and/or receive chains to use.

Power consumption may be another consideration in mmWave communication and in ARTD techniques. When heavy transmission happens, the local temperature near the current transmit and/or receive antenna panels may increase significantly, based on which it may be beneficial to reduce transmit power or otherwise mitigate the potential for damaging UE components due to overheating. Accordingly, temperature information from the local vicinity of the current transmit and receive chains (and other candidate chains with temperature sensors) could be used when performing transmit and/or receive antenna selection, e.g., to avoid potential overheating problems. Additionally (e.g., depending on the power cost of different beamforming patterns, which may use different numbers of active antenna elements), the receive beamforming/chain can also be adjusted to help avoid potential overheating, and/or to modify the power consumption and/or performance profile of the UE.

As one possibility for using information from sensor circuitry when performing ARTD techniques, a UE can determine how stable the motion and/or orientation state of the UE is, e.g., based on the UE's measured motion/rotation. This may include performing time window based observations on the maximum and/or mean rotation angle, that can be filtered (or not, as desired) and compared with one or more preselected thresholds to determine the rotation stability state of the UE, as one possibility. As another possibility, a rotation outage ratio (e.g., the number of times that the UE has rotated more than a threshold) can be used as an input to determining the rotation stability state of the UE. The rotation stability state could be determined from one of multiple possible states, such as a stable state, a rotating state, and/or one or more other (e.g., intermediate) states. If desired, UE orientation information and angular speed could also or alternatively be used as inputs. In case motion/ orientation information is (e.g., temporarily) unavailable, it may also be possible for the UE to determine the rotation stability state of the UE based at least in part on the receive beamforming change rate, e.g., as an indicator of the UE's motion/rotation state. Based on which rotation stability state the UE determines it is in, the UE could accordingly prioritize reducing power consumption (e.g., while in a relatively stable state) or providing good link quality (e.g., while in a relatively unstable state).

Figure 19:
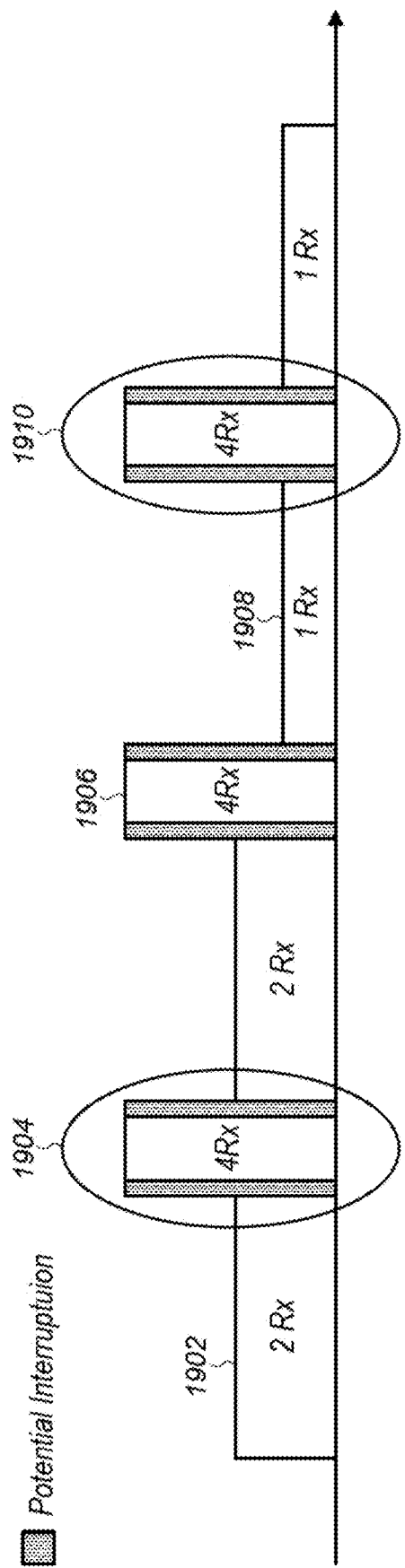
FIG. 19 illustrates aspects of a possible scenario in which the number of receive chain measurement instances can be adaptively reduced if the UE is in a relatively stable rotation stability state, according to some embodiments.

For example, while in a relatively stable state in which transmit and/or receive chain switching (e.g., both with respect to how many chains are in use and which chain(s) is (are) in use) may be less likely, it may be possible for a UE to reduce the number of receive chain measurement instances. FIG. 19 illustrates aspects of a possible scenario in which the number of receive chain measurement instances can be adaptively reduced if the UE is in a relatively stable rotation stability state, according to some embodiments. As shown, in 1902, the UE may be using 2 receive chains to receive downlink communication. In 1904, a potential interruption to the downlink communication to perform receive chain measurements on 4 receive chains of the UE may occur. However, if UE is in a sufficiently stable rotation stability state, it may be the case that the UE determines not to perform the receive chain measurements, or possibly to perform the receive chain measurements with a reduced duration. In 1906, another receive chain measurement opportunity may occur, and the UE may perform receive chain measurements. Based on these receive chain measurements, in 1908, the UE may determine to reduce the number of receive chains in use to 1 receive chain. In 1910, another receive chain measurement opportunity may occur, and the UE may again dynamically determine whether to perform the receive chain measurements (or possibly to perform the receive chain measurements with a reduced duration), e.g., based at least in part on the rotation stability state of the UE. Thus, it may be possible to reduce UE power consumption for receive chain monitoring, e.g., by either skipping or shrinking measurement duration, for both receive and transmit antenna evaluation purposes. This may also reduce the potential for interruption to baseband processing. Filtering coefficients for transmit/receive chain measurements can be adjusted so that the same time constant is achieved with different measurements cycles, if desired. Receive chain evaluation can adopt the same beam direction to further save power, e.g., as fewer beamforming measurements may be performed in that case, at least according to some embodiments. Additionally or alternatively, it may be the case that some transmit/receive chains can be dropped from periodic monitoring while in a sufficiently stable rotation state, e.g., based on the current orientation of the UE, according to some embodiments. As a still further possibility, it may be the case that the UE dynamically adjusts the amount of time before the number of receive chains (e.g., 4Rx to 2Rx to 1Rx) in use can be reduced while in a sufficiently stable rotation state, e.g., by reducing the time hysteresis parameter for that decision, e.g., since channel related conditions may be less likely to change frequently while in a relatively stable rotation state.

Figure 20:
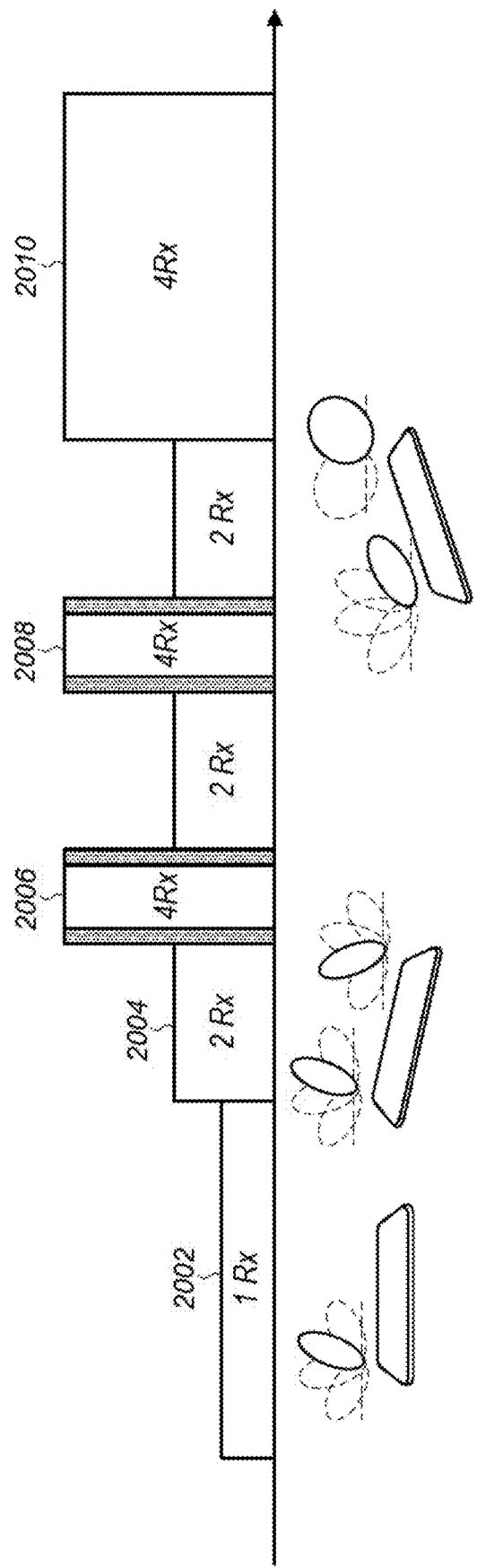
FIG. 20 illustrates aspects of a possible scenario in which the number of receive chain measurement instances can be adaptively increased if the UE is in a relatively unstable rotation stability state, according to some embodiments.

As another possibility, while in a relatively unstable state in which transmit and/or receive chain switching (e.g., both with respect to how many chains are in use and which chain(s) is (are) in use) may be more likely, it may be possible for a UE to increase the number of receive chain measurement instances. FIG. 20 illustrates aspects of a possible scenario in which the number of receive chain measurement instances can be adaptively increased if the UE is in a relatively unstable rotation stability state, according to some embodiments. As shown, in 2002, the UE may be using 1 receive chain to receive downlink communication. In 2004, the UE may increase to 2 receive chains. In 2006 and in 2008, receive chain measurement opportunities may occur, in which the UE may perform receive chain measurements on 4 receive chains. Such opportunities may be added and taken based at least in part on the UE being in a relatively unstable rotation stability state, at least in some embodiments. Based at least in part on these receive chain measurements, in 2010, the UE may determine to increase the number of receive chains in use to 4 receive chains. Thus, it may be the case that receive chains that are disabled due to antenna receive diversity for power saving can be turned on to maintain downlink quality if fast UE rotation is occurring, and for more frequent measurements for potential antenna panel/module switches to be performed, e.g., particularly if the signal quality starts to drop. In some instances, omni-directional or wide transmit/receive beams may be preferred, and/or predicted beams (e.g., when orientation information is available) on different receive chains can be adopted when evaluating the quality of other receive chains, when the UE is in a relatively unstable rotation state. More antenna panels may be opened for monitoring in such a fast rotating state, e.g., to prepare for antenna panel switches, particularly if different antenna panels are configured to cover different beamforming directions. It may be the case that fast filtering is adopted when comparing the quality of receive chains in such a scenario. Note that antenna panel selection with UE autonomous beam sweep may be confirmed again after the UE leaves a rotating/unstable state and becomes stable.

Figure 21:
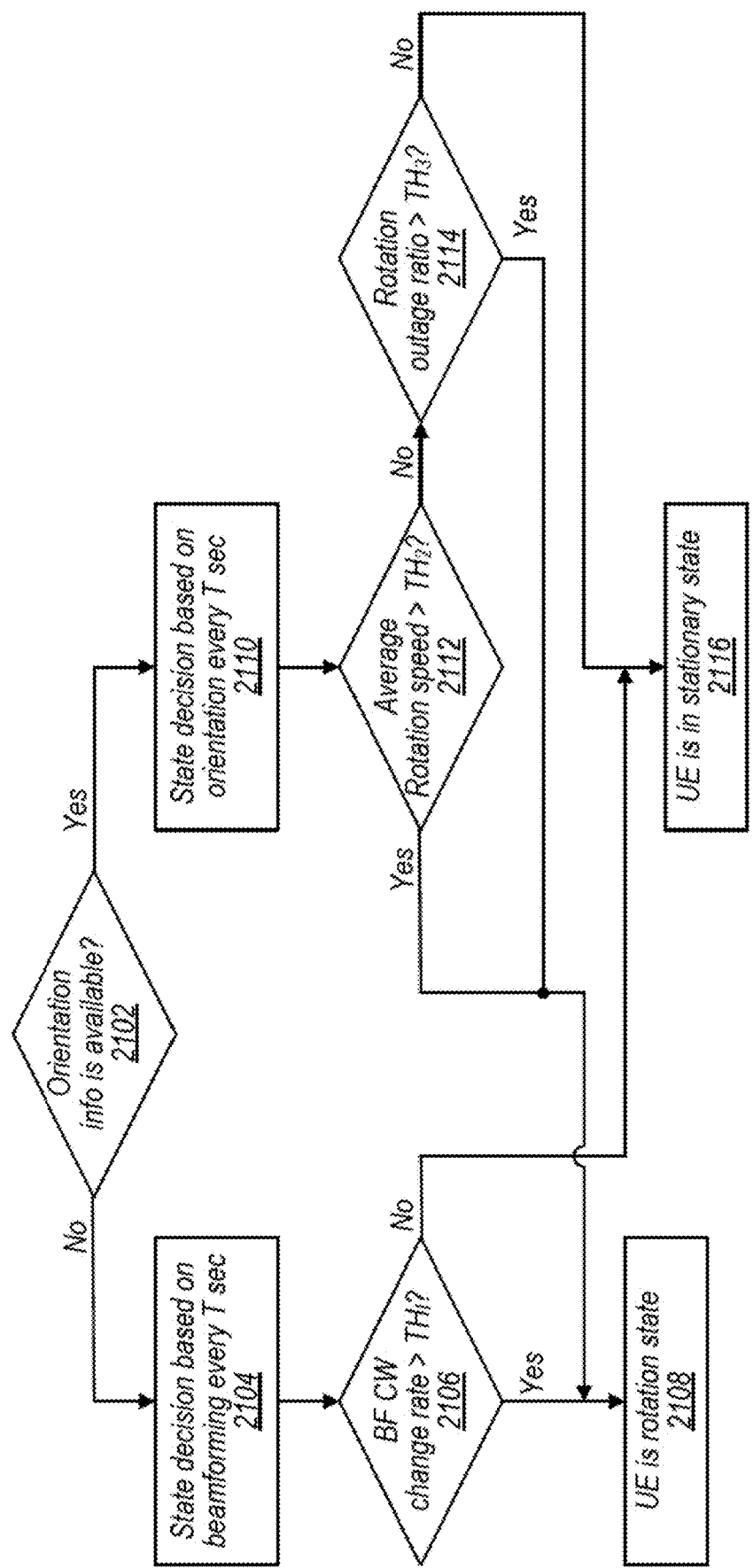
FIG. 21 is a flowchart diagram illustrating aspects of an exemplary possible method for determining a rotation stability state of a UE, according to some embodiments.
Figure 22:
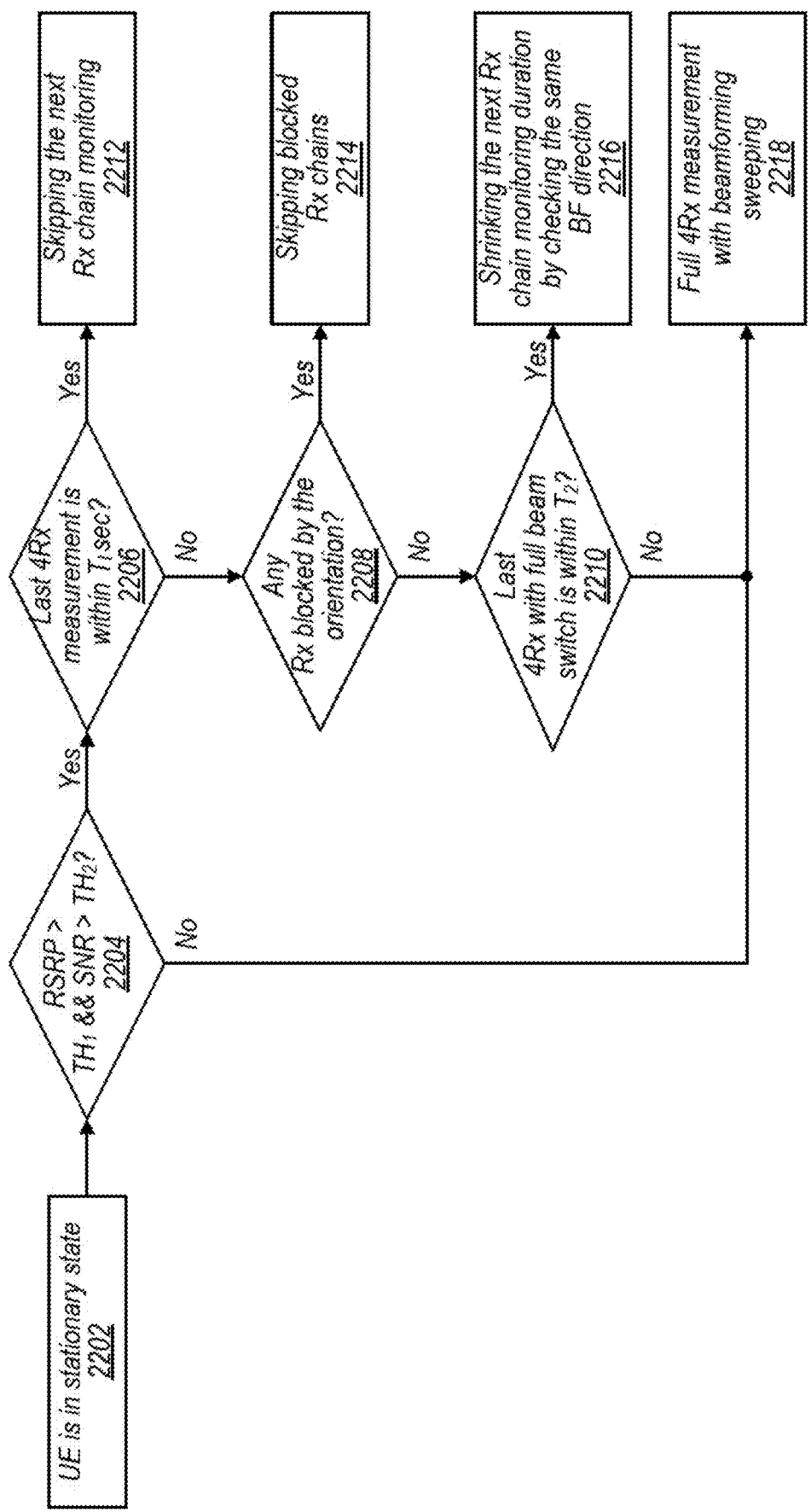
FIG. 22 is a flowchart diagram illustrating aspects of an exemplary possible method for adapting receive chain monitoring behavior when in a stationary or stable rotation stability state, according to some embodiments.
Figure 23:
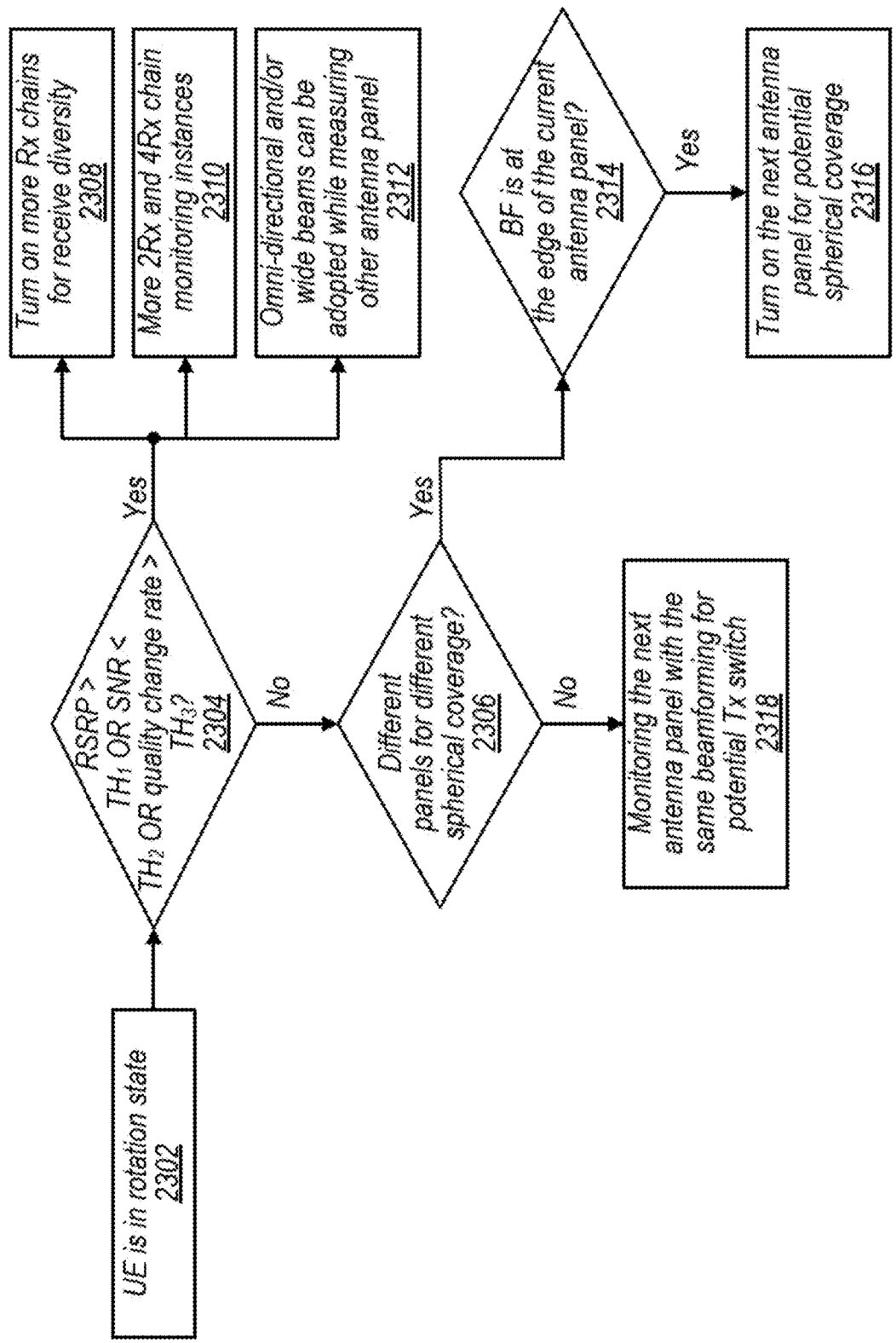
FIG. 23 is a flowchart diagram illustrating aspects of an exemplary possible method for adapting receive chain monitoring behavior when in a rotating or unstable rotation stability state, according to some embodiments.

FIGS. 21-23 are flowchart diagrams illustrating aspects of exemplary possible methods for determining a rotation stability state of a UE and adapting receive chain monitoring behavior accordingly, according to some embodiments. In particular, FIG. 21 illustrates aspects of a possible method for determining a rotation stability state of a UE, according to some embodiments. As shown, in 2102, it may be determined if orientation information (e.g., from motion/rotation sensing circuitry of the UE) is available. If not, in 2104, the UE may periodically determine its rotation stability state based on a beamforming change rate of the UE. In this case, in 2106, it may be determined if the beamforming codeword change rate is greater than a certain threshold ("$TH_1$"). If so, in 2108, it may be determined that the UE is in a rotation (or "unstable") state. If not, in 2116, it may be determined that the UE is in a stationary (or "stable") state.

If orientation is available, in 2110, the UE may periodically determine its rotation stability state based on the orientation information for the UE. In this case, in 2112, it may be determined if the average rotation speed of the UE is greater than a certain threshold ("$TH_2$"). If so, in 2108, it may be determined that the UE is in a rotation (or "unstable") state. If not, in 2114, it may be determined if the rotation outage ratio of the UE is greater than a certain threshold ("$TH_3$"). If so, in 2108, it may be determined that the UE is in a rotation (or "unstable") state. If not, in 2116, it may be determined that the UE is in a stationary (or "stable") state.

FIG. 22 illustrates aspects of a possible method for adapting receive chain monitoring behavior when in a stationary state, according to some embodiments. As shown, in 2202, it may be determined (e.g., in accordance with the method of FIG. 21, as one possibility) that the UE is in a stationary state. In 2204, it may be determined if reference signal received power (RSRP) is greater than a certain threshold ("$TH_1$", which may represent a different threshold than the $TH_1$ used in the method of FIG. 21) and signal to noise ratio (SNR) is greater than a certain threshold ("$TH_2$", which may represent a different threshold than the $TH_2$ used in the method of FIG. 21). If not, in 2218, the UE may perform full 4 Rx chain measurements with beamforming sweeping when performing receive chain monitoring. If so, in 2206, it may be determined if the last 4 Rx chain measurement occurred withing a certain number ("$T_1$") of seconds. If so, in 2212, the UE may skip the next receive chain monitoring instance. If not, in 2208, it may be determined if any Rx chains of the UE are blocked by the current orientation of the UE. If so, in 2214, the UE may skip the blocked Rx chain(s) when performing Rx chain measurements. If not, in 2210, the UE may determine if the last 4 Rx chain measurement with full beam switch occurred withing a certain number ("$T_2$") of seconds. If so, in 2216, the UE may shrink the next Rx chain monitoring duration by checking the same beamforming direction as currently or most recently used (e.g., rather than performing full beamforming sweeping). If not, in 2218, the UE may perform full 4 Rx chain measurements with beamforming sweeping.

FIG. 23 illustrates aspects of a possible method for adapting receive chain monitoring behavior when in a rotation state, according to some embodiments. As shown, in 2302, it may be determined (e.g., in accordance with the method of FIG. 21, as one possibility) that the UE is in a rotation state. In 2304, it may be determined if RSRP is less than a certain threshold ("$TH_1$") or SNR is less than a certain threshold ("$TH_2$") or quality change rate is greater than a certain threshold ("$TH_3$"). If so, the UE may implement one or more of steps 2308, 2310, or 2312. Step 2308 may include turning on more receive chains for receive diversity. Step 2310 may include adding more 2 Rx chain and 4 Rx chain monitoring instances. Step 2312 may include adopting omni-directional and/or wide beams while measuring other antenna panels. If RSRP is greater than $TH_1$, SNR is greater than $TH_2$, and quality change rate is below $TH_3$, in 2306, it may be determined if the UE utilizes different panels for different spherical coverage. If not, in 2318, the UE may monitor the next antenna panel with the same beamforming for a potential Tx switch. If so, however, in 2314, it may further be determined if the current beamforming is at the edge of the current antenna panel. If so, in 2316, the next antenna panel may be turned on for potential spherical coverage.

Temperatures sensor readings may also be useful for ARTD techniques. For example, if the temperature sensor reading near the current antenna module/panel is greater than a certain threshold, and the RSRP/SNR available at other antenna module(s) is within a certain threshold (or set of thresholds) of the current RSRP/SNR, it may be beneficial to switch transmit antennas. Note that even without such temperature information, it may be possible to implement ARTD techniques that can include features to proactively avoid overheating, such as features intended to avoid using the same transmit antenna (module/panel) for heavy transmission for a long period of time continuously. Additionally or alternatively, it may be possible to shut down some antenna elements of the current antenna module (e.g., depending on the power cost to have each antenna element on/off) if the current antenna module reaches a certain temperature. For example, the number of active antenna elements could be switched from 4 to 2, e.g., to reduce the power consumption and potential heat buildup. Note that this may result in a wider beamwidth (e.g., if neighbor antenna elements are left on) or the same beamwidth (e.g., if alternating elements are turned off), at least according to some embodiments. Additionally, note that reducing the number of active antenna elements in this manner may result in a reduction in equivalent isotropically radiated power (EIRP), at least in some instances. As a still further possibility, if a UE is in good coverage, it may be beneficial for the UE to relax the beamwidth used by sacrificing some beamforming gain. In other words, the UE may choose to switch from a narrow beam to a broader beam by shutting down some antenna elements, e.g., to reduce power consumption.

Figure 24:
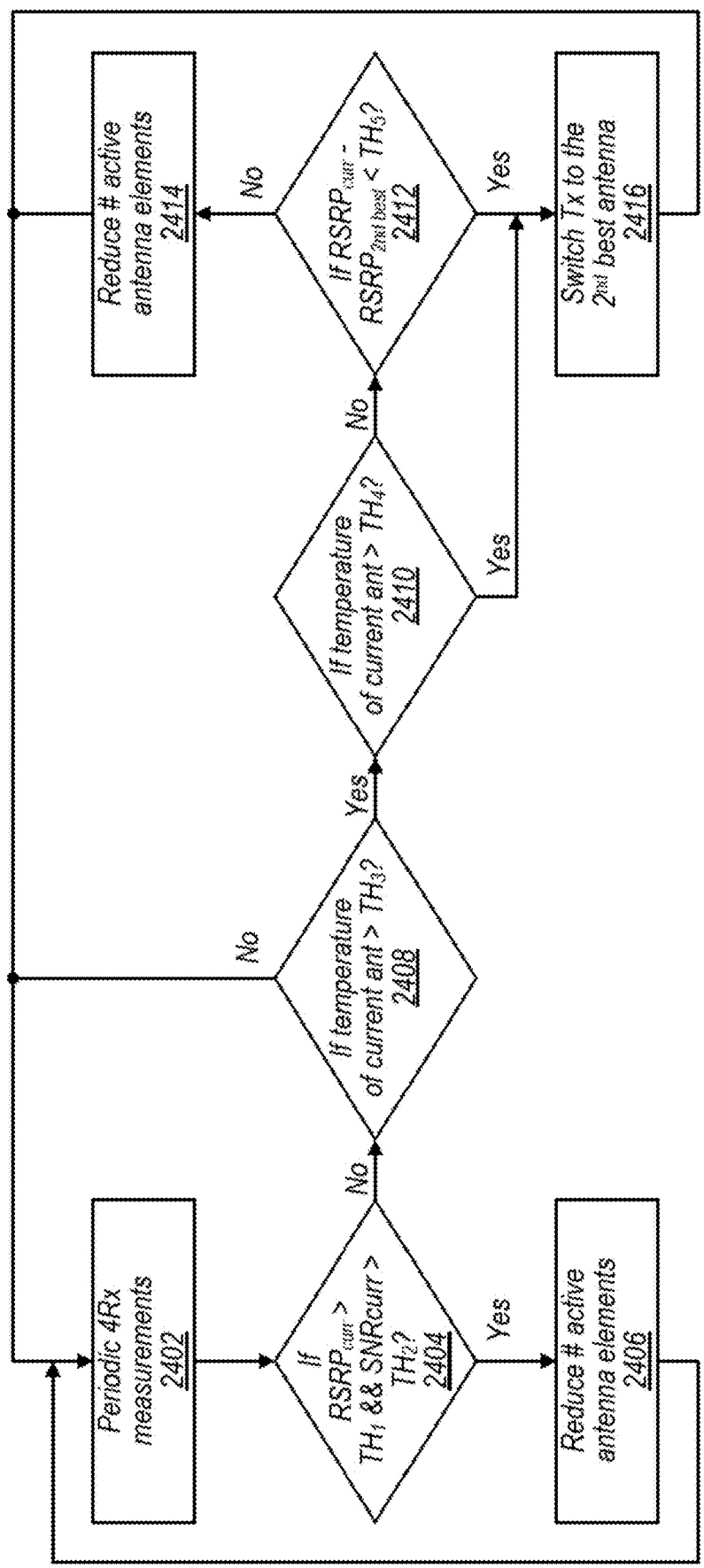
FIG. 24 is a flowchart diagram illustrating aspects of an exemplary possible method for adapting an antenna configuration of a UE based on temperature information for the UE, according to some embodiments.

FIG. 24 is a flowchart diagram illustrating aspects of an exemplary possible method for adapting an antenna configuration of a UE based on temperature information for the UE, according to some embodiments. As shown, in 2402, the UE may perform periodic 4 Rx chain measurements. In 2404, it may be determined if the RSRP of the current antenna module is greater than a certain threshold ("$TH_1$") and if the SNR of the current antenna module is greater than a certain threshold ("$TH_2$"). If so, in 2406, the number of active antenna elements may be reduced. If not, in 2408, it may be determined if the temperature of the current antenna module is greater than a certain threshold ("$TH_3$"). If not, the UE may return to step 2402 and continue periodic 4 Rx chain measurements. If so, however, in 2410, the UE may determine if the temperature of the current antenna module is greater than a further threshold ("$TH_4$"), which may be higher than the previously used temperature threshold $TH_3$. If so, in 2416, the UE may switch to the next best antenna module. If the temperature of the current antenna module is not greater than $TH_4$, in 2412, it may be determined if the RSRP of the current antenna module minus the RSRP of the next best antenna module is greater than a certain threshold ("$TH_5$"). If so, the UE may proceed to step 2416. If not, in 2414, the number of active antenna elements of the current antenna module may be reduced.

For a wireless device that has multiple antenna panels, when switching between such panels, it be desirable to keep the same beamforming direction, at least in some circumstances. Similarly, it may be desirable to keep the same beamforming direction when switching beamwidth on the same antenna panel. The orientation/size/location of an antenna element array may vary for different antenna panels, such that the alignment of codebooks to support beamforming direction associations between different antenna panels may be non-trivial. Accordingly, it may be possible to assign an index to each beamforming codeword in the codebook of each antenna panel, such that the same index in different codebooks can lead to the same beamforming direction. Furthermore, the indices can be assigned such that codewords with narrow beamwidths can carry the index of an associated wider beamwidth codeword as the most significant bit or prefix of its index. Additionally, instantaneous orientation information for the UE can then be used to prioritize antenna panel/beamforming selection based on the UE gesture.

Figure 26:
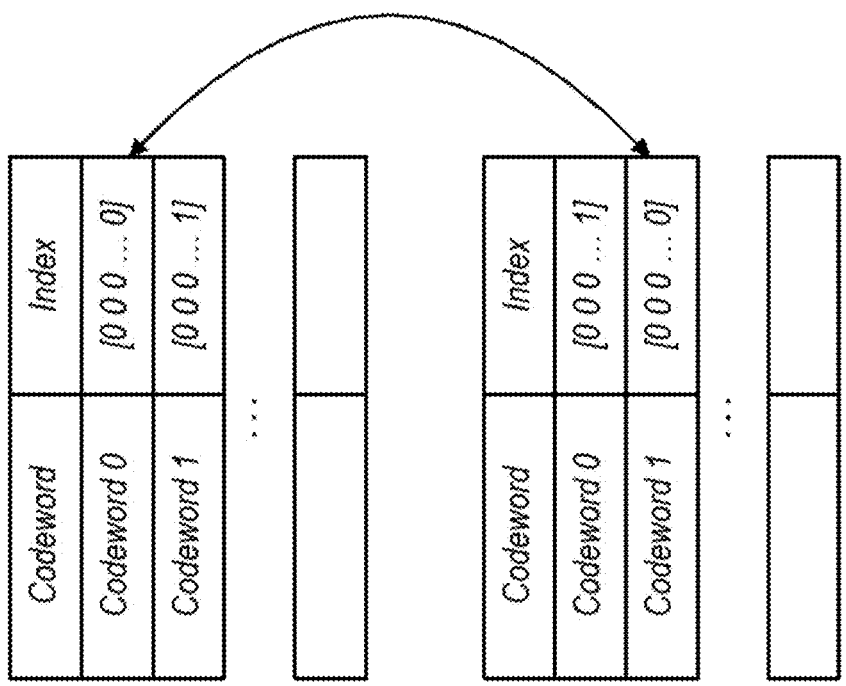
FIGS. 25-27 illustrate aspects of a possible approach to indexing beamforming codewords of different codebooks that are associated with the same direction to facilitate codeword selection when switching antenna panels, according to some embodiments.
Figure 25:
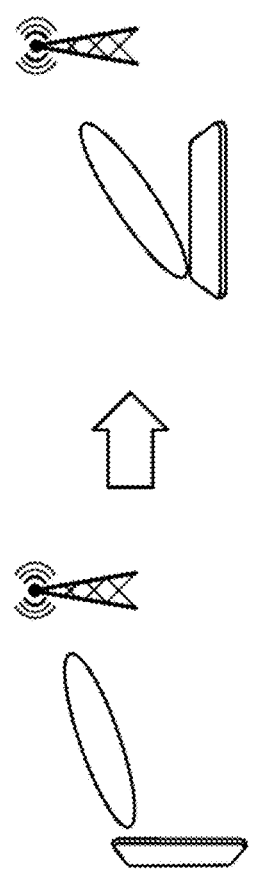
Figure 27:
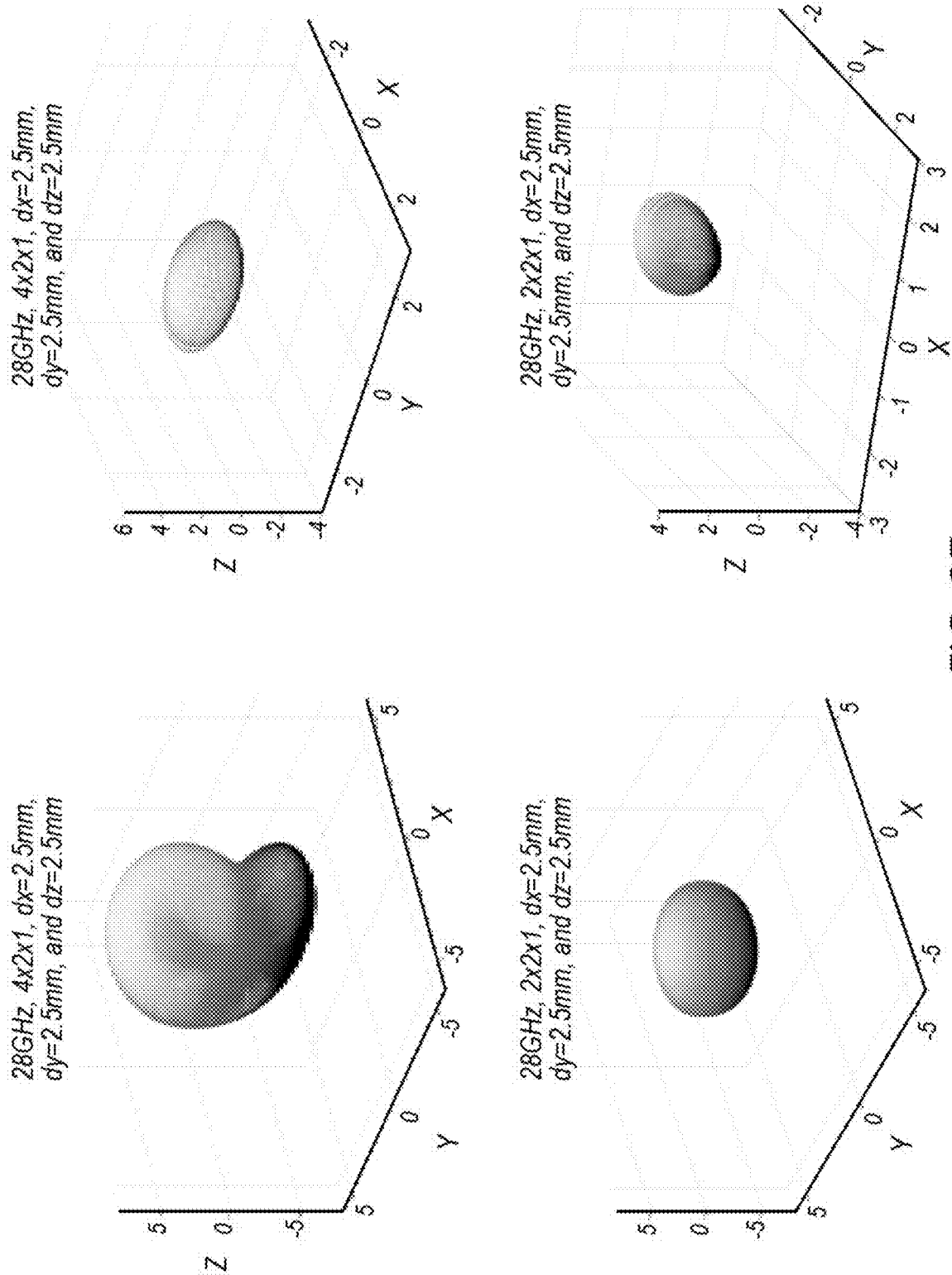

FIGS. 25-27 illustrate aspects of such a possible approach to indexing beamforming codewords of different codebooks that are associated with the same beamforming direction to facilitate codeword selection when switching antenna panels, according to some embodiments. FIG. 25 illustrates aspects of an example scenario in which a UE may change orientation, which may in turn cause the UE to determine to switch antenna panels. FIG. 26 illustrates a portion of an exemplary possible set of codebooks associated with different antenna panels of a wireless device. In the illustrated example, codeword 0 of the first codebook may have the same index as codeword 1 of the second codebook, indicating that these codewords may both be associated with the same beamforming direction. Note that the codeword for a 4×2 antenna element array pointing to (45,45) (azimuth, elevation) degrees may be different from the codeword of a 2×2 antenna element array pointing to roughly the same direction. Due to the dimension differences of the antenna arrays, the beamforming gain/beamwidth may also be different. For mapping of codewords, in addition to beam direction, beamwidth may also be useful to consider; e.g., following the preceding example, it may be the case that a beam from a 2×2 antenna array should be mapped to a beam from a 4×2 array in the same direction but with wider beamwidth. FIG. 27 illustrates possible array responses and total responses for such differing sizes of antenna panels, according to some embodiments. In particular, the upper and lower left portions of FIG. 27 illustrate the array response for a 4×2 and 2×2 antenna array, respectively, while the upper and lower right portions of FIG. 27 illustrate the total response for a 4×2 and 2×2 antenna array, respectively, at least according to one possible example scenario.

In the following further exemplary embodiments are provided.

One set of embodiments may include an apparatus, comprising: a processor configured to cause a wireless device to: determine a rotation delta of the wireless device relative to a previous beamforming tracking operation; and perform beamforming tracking based at least in part on the rotation delta of the wireless device relative to the previous beamforming tracking operation.

According to some embodiments, the beamforming tracking is performed during a connected discontinuous reception (CDRX) on duration, wherein the previous beamforming tracking operation occurred during a previous CDRX on duration.

According to some embodiments, the processor is further configured to cause the wireless device to: determine wireless device wakeup timing during a subsequent CDRX off duration based at least in part on rotation information for the wireless device.

According to some embodiments, more frequent wireless device wakeup timing is selected during the subsequent CDRX off duration if the wireless device has a greater rotation speed.

According to some embodiments, to perform beamforming tracking based at least in part on the rotation delta of the wireless device relative to the previous beamforming tracking operation, the processor is further configured to cause the wireless device to select one or more of: an antenna panel; a beamforming codeword; or a beam width; for the beamforming tracking based at least in part on the rotation delta of the wireless device relative to the previous beamforming tracking operation.

According to some embodiments, the processor is further configured to cause the wireless device to: determine an uncertainty of the determined rotation delta; and select a wider beam width for the beamforming tracking operation if the determined rotation delta has a greater uncertainty.

Another set of embodiments may include a wireless device, comprising: an antenna; a radio operably coupled to the antenna; and a processor operably coupled to the radio; wherein the wireless device is configured to: determine a rotation stability state of the wireless device; and determine a number of receive chains to use for receive chain monitoring and/or a frequency at which to perform receive chain monitoring based at least in part on the rotation stability state of the wireless device.

According to some embodiments, to determine the rotation stability state of the wireless device, the wireless device is further configured to: perform one or more rotation measurements for the wireless device; determine that the wireless device is in a first rotation stability state if a result of the one or more rotation measurements is greater than a configured threshold; and determine that the wireless device is in a second rotation stability state if a result of the one or more rotation measurements is less than the configured threshold.

According to some embodiments, the one or more rotation measurements include one or more of: a filtered measurement of a maximum rotation angle of the wireless device over a configured time window; a filtered measurement of a mean rotation angle of the wireless device over a configured time window; or a rotation outage ratio.

According to some embodiments, if rotation measurements for the wireless device are unavailable, the wireless device is further configured to: determine the rotation stability state of the wireless device based at least in part on a receive beamforming change rate of the wireless device.

According to some embodiments, the wireless device is further configured to: prioritize power saving when determining the number of receive chains to use for receive chain monitoring and/or the frequency at which to perform receive chain monitoring more highly when the wireless device is in a stable rotation stability state than when the wireless device is in an unstable rotation stability state; and prioritize link quality when determining the number of receive chains to use for receive chain monitoring and/or the frequency at which to perform receive chain monitoring more highly when the wireless device is in the unstable rotation stability state than when the wireless device is in the stable rotation stability state.

According to some embodiments, to prioritize power saving more highly when the wireless device is in the stable rotation stability state than when the wireless device is in the unstable rotation stability state, when the wireless device is in the stable rotation stability state, the wireless device is further configured to reduce one or more of: a frequency at which receive chain monitoring is performed; a number of receive chains that are monitored during receive chain monitoring; a measurement duration for receive chain monitoring; or a time hysterisis parameter for reducing a number of receive chains in use.

According to some embodiments, to prioritize link quality more highly when the wireless device is in the unstable rotation stability state than when the wireless device is in the stable rotation stability state, when the wireless device is in the unstable rotation stability state, the wireless device is further configured to increase one or more of: a frequency at which receive chain monitoring is performed; a number of receive chains that are monitored during receive chain monitoring; a beam width used when performing receive chain monitoring; or a measurement duration for receive chain monitoring.

Yet another set of embodiments may include a method, comprising: by a wireless device: performing one or more motion, rotation, or temperature measurements on the wireless device; and performing receive and transmit chain selection based at least in part on the one or more motion, rotation, or temperature measurements on the wireless device.

According to some embodiments, the method further comprises: determining a temperature of a currently active antenna panel of the wireless device; determining to modify an antenna configuration of the wireless device if the temperature of the currently active antenna panel is above a first temperature threshold.

According to some embodiments, the method further comprises: determining to reduce the number of active antenna elements of the currently active antenna panel if the temperature of the currently active antenna panel is above the first temperature threshold, if the temperature of the currently active antenna panel is below a second temperature threshold, and if a signal strength at the currently active antenna panel minus a signal strength at an antenna panel with a next highest signal strength is greater than a signal strength threshold, wherein the second temperature threshold is higher than the first temperature threshold.

According to some embodiments, the method further comprises: determining to switch to an antenna panel with a next highest signal strength if the temperature of the currently active antenna panel is above the first temperature threshold and if a signal strength at the currently active antenna panel minus a signal strength at the antenna panel with the next highest signal strength is less than a signal strength threshold.

According to some embodiments, the method further comprises: determining to switch to an antenna panel with a next highest signal strength if the temperature of the currently active antenna panel is above a second temperature threshold, wherein the second temperature threshold is higher than the first temperature threshold.

According to some embodiments, the method further comprises: using a first antenna panel to perform cellular communication with a cellular base station using a first beamforming codeword associated with a first beam direction; determining to switch from using the first antenna panel to using a second antenna panel; determining that a second beamforming codeword for the second antenna panel is also associated with the first beamforming direction; and using the second antenna panel to perform cellular communication with the cellular base station using the second beamforming codeword based at least in part on determining that the second beamforming codeword for the second antenna panel is also associated with the first beamforming direction.

According to some embodiments, codewords of different codebooks associated with different antenna panels that are associated with the same beamforming direction are configured with the same index value, wherein determining that the second beamforming codeword for the second antenna panel is also associated with the first beamforming direction further comprises: determining that the second beamforming codeword has a same index value as the first beamforming codeword.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless device, comprising:
an antenna;
a radio operably coupled to the antenna; and
a processor operably coupled to the radio;
wherein the wireless device is configured to:
  determine a rotation stability state of the wireless device based on at least one of a rotation speed or rotation outage ratio; and
  determine, based at least in part on the rotation stability state of the wireless device, at least one of:
    a number of receive chains to use for receive chain monitoring; or
    a frequency at which to perform receive chain monitoring.

2. The wireless device of claim 1, wherein to determine the rotation stability state of the wireless device, the wireless device is further configured to:
perform one or more rotation measurements for the wireless device;
determine that the wireless device is in a first rotation stability state if a result of the one or more rotation measurements is greater than a configured threshold; and
determine that the wireless device is in a second rotation stability state if the result of the one or more rotation measurements is less than the configured threshold.

3. The wireless device of claim 2, wherein the one or more rotation measurements include one or more of:
a filtered measurement of a maximum rotation angle of the wireless device over a configured time window;
a filtered measurement of a mean rotation angle of the wireless device over a configured time window; or
a rotation outage ratio.

4. The wireless device of claim 1, wherein if rotation measurements for the wireless device are unavailable, the wireless device is further configured to:
determine the rotation stability state of the wireless device based at least in part on a receive beamforming change rate of the wireless device.

5. The wireless device of claim 1, wherein the wireless device is further configured to:
prioritize power saving when determining the number of receive chains to use for receive chain monitoring or the frequency at which to perform receive chain monitoring more highly when the wireless device is in a stable rotation stability state than when the wireless device is in an unstable rotation stability state; and
prioritize link quality when determining the number of receive chains to use for receive chain monitoring or the frequency at which to perform receive chain monitoring more highly when the wireless device is in the unstable rotation stability state than when the wireless device is in the stable rotation stability state.

6. The wireless device of claim 5, wherein to prioritize power saving more highly when the wireless device is in the stable rotation stability state than when the wireless device is in the unstable rotation stability state, when the wireless device is in the stable rotation stability state, the wireless device is further configured to reduce one or more of:
a frequency at which receive chain monitoring is performed;
a number of receive chains that are monitored during receive chain monitoring;
a measurement duration for receive chain monitoring; or
a time hysterisis parameter for reducing a number of receive chains in use.

7. The wireless device of claim 5, wherein to prioritize link quality more highly when the wireless device is in the unstable rotation stability state than when the wireless device is in the stable rotation stability state, when the wireless device is in the unstable rotation stability state, the wireless device is further configured to increase one or more of:
a frequency at which receive chain monitoring is performed;
a number of receive chains that are monitored during receive chain monitoring;
a beam width used when performing receive chain monitoring; or
a measurement duration for receive chain monitoring.

8. The wireless device of claim 1, wherein said determining the rotation stability state is performed during connected discontinuous reception (CDRX).

9. The wireless device of claim 8, wherein said determining the rotation stability state is performed based on a comparison of sequential CDRX on durations.

10. The wireless device of claim 8, wherein the wireless device is further configured to:
determine wireless device wakeup timing during a subsequent CDRX off duration based at least in part on rotation information for the wireless device.

11. The wireless device of claim 10,
wherein more frequent wireless device wakeup timing is selected during the subsequent CDRX off duration if the wireless device has a greater rotation speed.

12. The wireless device of claim 1, wherein the rotation stability state of the wireless device is one of a stable rotation stability state or an unstable rotation stability state.

13. A method, comprising:
by a wireless device:
performing measurements including:
one or more measurements of temperature of the wireless device, wherein the one or more measurements of temperature comprises a temperature of a currently active antenna panel of the wireless device; and
at least one measurement of motion or rotation of the wireless device; and
performing receive and transmit chain selection based at least in part on the one or more measurements of temperature and the at least one measurement of motion or rotation of the wireless device, wherein, as part of the receive and transmit chain selection, the method further comprises at least one of:
determining to reduce a number of active antenna elements of the currently active antenna panel if the temperature of the currently active antenna panel is above a first temperature threshold, if the temperature of the currently active antenna panel is below a second temperature threshold, and if a signal strength at the currently active antenna panel minus a signal strength at an antenna panel with a next highest signal strength is greater than a signal strength threshold, wherein the second temperature threshold is higher than the first temperature threshold; or
determining to switch to an antenna panel with a next highest signal strength if the temperature of the currently active antenna panel is above the first temperature threshold and if a signal strength at the currently active antenna panel minus a signal strength at the antenna panel with the next highest signal strength is less than a signal strength threshold.

14. The method of claim 13, wherein a receive and transmit chain selection is modified if the temperature of the currently active antenna panel is above a first temperature threshold.

15. The method of claim 14, wherein, as part of the receive and transmit chain selection, the method further comprises:
determining to switch to an antenna panel with a next highest signal strength if the temperature of the currently active antenna panel is above a second temperature threshold, wherein the second temperature threshold is higher than the first temperature threshold.

16. The method of claim 13, wherein the method further comprises:
using a first antenna panel to perform cellular communication with a cellular base station using a first beamforming codeword associated with a first beam direction, wherein said receive and transmit chain selection comprises:
determining to switch from using the first antenna panel to using a second antenna panel;
determining that a second beamforming codeword for the second antenna panel is also associated with the first beam direction; and
using the second antenna panel to perform cellular communication with the cellular base station using the second beamforming codeword based at least in part on determining that the second beamforming codeword for the second antenna panel is also associated with the first beam direction.

17. The method of claim 16, wherein codewords of different codebooks associated with different antenna panels that are associated with the same beam direction are configured with the same index value, wherein determining that the second beamforming codeword for the second antenna panel is also associated with the first beam direction further comprises:
determining that the second beamforming codeword has a same index value as the first beamforming codeword.

18. An apparatus, comprising:
a processor configured to cause a wireless device to:
determine a rotation stability state of the wireless device based on at least one of a rotation speed or rotation outage ratio; and
determine, based at least in part on the rotation stability state of the wireless device, at least one of:
a number of receive chains to use for receive chain monitoring; or
a frequency at which to perform receive chain monitoring.

19. The apparatus of claim 18, wherein to determine the rotation stability state of the wireless device, the processor is further configured to cause the wireless device to:
perform one or more rotation measurements for the wireless device;
determine that the wireless device is in a first rotation stability state if a result of the one or more rotation measurements is greater than a configured threshold; and
determine that the wireless device is in a second rotation stability state if the result of the one or more rotation measurements is less than the configured threshold.

20. The apparatus of claim 18, wherein the rotation stability state of the wireless device is one of a stable rotation stability state or an unstable rotation stability state.

* * * * *